US008823963B2

(12) United States Patent
Imaizumi et al.

(10) Patent No.: US 8,823,963 B2
(45) Date of Patent: Sep. 2, 2014

(54) APPARATUS FOR OUTPUTTING IMAGE, APPARATUS FOR INPUTTING IMAGE, COMPUTER, METHOD FOR DISPLAYING SCREEN, COMPUTER-READABLE STORAGE MEDIUM FOR COMPUTER PROGRAM; AND ADAPTABLE DISPLAY DEVICE

(71) Applicants: Shoji Imaizumi, Shinshiro (JP);
Kaitaku Ozawa, Nishinomiya (JP);
Takeshi Minami, Amagasaki (JP);
Hiroaki Kubo, Muko (JP)

(72) Inventors: Shoji Imaizumi, Shinshiro (JP);
Kaitaku Ozawa, Nishinomiya (JP);
Takeshi Minami, Amagasaki (JP);
Hiroaki Kubo, Muko (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 0 days.

(21) Appl. No.: 13/753,857

(22) Filed: Jan. 30, 2013

(65) Prior Publication Data

US 2013/0194603 A1 Aug. 1, 2013

(30) Foreign Application Priority Data

Jan. 31, 2012 (JP) ................................. 2012-017549

(51) Int. Cl.
*G06K 15/02* (2006.01)
*G06F 3/12* (2006.01)

(52) U.S. Cl.
CPC .............. *G06K 15/1801* (2013.01); *G06F 3/12* (2013.01)
USPC ......................... 358/1.13; 358/1.14; 358/1.15

(58) Field of Classification Search
USPC ................................. 358/1.13–1.15
See application file for complete search history.

(56) References Cited

U.S. PATENT DOCUMENTS

| 2009/0225357 | A1* | 9/2009 | Miyake et al. ............... 358/1.15 |
| 2010/0265541 | A1 | 10/2010 | Torii |
| 2010/0328729 | A1* | 12/2010 | Hirao et al. ................... 358/449 |
| 2011/0063673 | A1* | 3/2011 | Yoshida et al. ............. 358/1.15 |

FOREIGN PATENT DOCUMENTS

| JP | 2005-174121 A | 6/2005 |
| JP | 2007-144674 A | 6/2007 |
| JP | 2010-166384 A | 7/2010 |
| JP | 2010-250532 A | 11/2010 |

OTHER PUBLICATIONS

Machine translation for JP 2010-166384, IDS.*
Decision to Grant Patent issued on Jan. 28, 2014, by the Japanese Patent Office in corresponding Japanese Patent Application No. 2012-017549, and an English Translation. (6 pages).

* cited by examiner

*Primary Examiner* — Qian Yang
(74) *Attorney, Agent, or Firm* — Buchanan Ingersoll & Rooney PC

(57) ABSTRACT

An apparatus for outputting an image is provided. The apparatus includes a printer; a storage to store screen data on a screen in which a plurality of objects are provided and on which settings regarding a process for printing an image onto paper with the printer are made; an obtaining portion to obtain image data on a target image to be outputted; a display device to display, if a medium to which the target image is outputted is electronic paper, the screen based on the screen data in a manner to hide or not to place an unrelated object which is included in the objects and is not related to the electronic paper; and an output portion to output the image data to the electronic paper based on conditions designated on the screen displayed in such a manner that the unrelated object is hidden or not placed.

19 Claims, 33 Drawing Sheets

| OBJECT IDENTIFIER | OBJECT FILE NAME | COORDINATES | GROUP IDENTIFIER | MEDIUM TYPE REQUIREMENTS | INPUT SOURCE SPECIFICATION REQUIREMENTS | OUTPUT DESTINATION SPECIFICATION REQUIREMENTS |
|---|---|---|---|---|---|---|
| obj_a_001 | obj_a_001.txt | (X_a_001,Y_a_001) | — | — | — | — |
| obj_a_002 | obj_a_002.txt | (X_a_002,Y_a_002) | — | — | — | — |
| ... | ... | ... | ... | ... | ... | ... |
| obj_c_101 | obj_c_101.gif | (X_c_101,Y_c_101) | G001 | INPUT SOURCE = ELECTRONIC PAPER | — | — |
| obj_c_102 | obj_c_102.gif | (X_c_102,Y_c_102) | G001 | OUTPUT DESTINATION = ELECTRONIC PAPER | — | — |
| obj_c_103 | obj_c_103.gif | (X_c_103,Y_c_103) | G001 | — | EQUIPPED WITH COLOR DISPLAY FUNCTIONALITY | — |
| ... | ... | ... | ... | ... | ... | ... |
| obj_c_121 | obj_c_121.gif | (X_c_121,Y_c_121) | G002 | — | — | — |
| obj_c_122 | obj_c_122.gif | (X_c_122,Y_c_122) | G002 | — | — | — |
| ... | ... | ... | ... | ... | ... | ... |
| obj_c_201 | obj_c_201.gif | (X_c_201,Y_c_201) | G003 | INPUT SOURCE = ELECTRONIC PAPER, OUTPUT DESTINATION= ELECTRONIC PAPER | — | — |
| obj_c_202 | obj_c_202.gif | (X_c_202,Y_c_202) | G002 | — | EQUIPPED WITH COLOR DISPLAY FUNCTIONALITY | EQUIPPED WITH COLOR DISPLAY FUNCTIONALITY |
| ... | ... | ... | ... | ... | ... | ... |

FIG. 26

READY TO COPY.

CHANGE TRAY SETTINGS > FIRST

PAPER SIZE
A4
AUTO DETECT
WIDE PAPER
OK

COPIES 1

PAPER TYPE

PLAIN PAPER
SINGLE SIDE ONLY
SPECIAL PAPER
THICK1
THICK1+
THICK2
THICK3
LETTERHEAD
COLORED PAPER

64 – 90g/m²

1/2 ← →

DISPLAY JOB
SETTING DETAILS
A4  100.0%
CHECK DETAILS
2011/06/21  16:33
MEMORY 100%
Y M C K

| ITEM NUMBER | JOB TYPE | INPUT SOURCE | MFP IMAGE PROCESSING | SERVER TRANSFER | OUTPUT DESTINATION | MFP ENERGY-SAVING MODE |
|---|---|---|---|---|---|---|
| 1 | COPY | SCANNER | INPUT IMAGE PROCESSING, OUTPUT IMAGE PROCESSING | – | PRINTER | – |
| 2 | SCAN | SCANNER | INPUT IMAGE PROCESSING | ○ | SERVER | FIXING OFF |
| 3 | PRINT | PC | OUTPUT IMAGE PROCESSING | – | PRINTER | SCANNER OFF |
| 4 | SCAN TO BOX | SCANNER | INPUT IMAGE PROCESSING | – | BOX | FIXING OFF |
| 5 | BOX TO PRINT | BOX | OUTPUT IMAGE PROCESSING | – | PRINTER | SCANNER OFF |
| 6 | FAX TRANSMISSION | SCANNER | INPUT IMAGE PROCESSING | – | FAX MODEM | FIXING OFF |
| 7 | FAX RECEPTION | FAX MODEM | OUTPUT IMAGE PROCESSING | – | PRINTER | SCANNER OFF |
| 10 | COPY (ePaperCopy) | ELECTRONIC PAPER | – | – | ELECTRONIC PAPER | FIXING OFF, SCANNER OFF |
| 11 | COPY (EditPaper) | ELECTRONIC PAPER | INPUT IMAGE PROCESSING, OUTPUT IMAGE PROCESSING | – | ELECTRONIC PAPER | FIXING OFF, SCANNER OFF |
| 12-1 | COPY (Scan To ePaper) | SCANNER | INPUT IMAGE PROCESSING | – | ELECTRONIC PAPER | FIXING OFF |
| 12-2 | SCAN TO SERVER | ELECTRONIC PAPER | INPUT IMAGE PROCESSING | ○ | SERVER | FIXING OFF, SCANNER OFF |
| 13 | COPY (ePaper To Print) | ELECTRONIC PAPER | OUTPUT IMAGE PROCESSING | – | PRINTER | FIXING OFF, SCANNER OFF |
| 14 | ePaper To BOX | ELECTRONIC PAPER | RESOLUTION CONVERSION | – | BOX | FIXING OFF, SCANNER OFF |
| 15 | BOX To ePaper | BOX | RESOLUTION CONVERSION | – | ELECTRONIC PAPER | FIXING OFF, SCANNER OFF |
| 16 | ePaper To FAX TRANSMISSION | ELECTRONIC PAPER | RESOLUTION CONVERSION | – | FAX MODEM | FIXING OFF, SCANNER OFF |
| 17 | FAX RECEPTION To ePaper | FAX MODEM | RESOLUTION CONVERSION | – | ELECTRONIC PAPER | FIXING OFF, SCANNER OFF |
| 20 | Print To ePaper | PC | – | – | ELECTRONIC PAPER | FIXING OFF, SCANNER OFF |

APPARATUS FOR OUTPUTTING IMAGE, APPARATUS FOR INPUTTING IMAGE, COMPUTER, METHOD FOR DISPLAYING SCREEN, COMPUTER-READABLE STORAGE MEDIUM FOR COMPUTER PROGRAM; AND ADAPTABLE DISPLAY DEVICE

This application is based on Japanese patent application No. 2012-017549 filed on Jan. 31, 2012, the contents of which are hereby incorporated by reference.

BACKGROUND OF THE INVENTION

1. Field of the Invention

The present invention relates to a technology for displaying a screen in an apparatus for obtaining an image from electronic paper or outputting an image to electronic paper.

2. Description of the Related Art

In recent years, resource and energy savings have been demanded from an ecological point of view. Accordingly, a variety of methods are proposed or implemented for the resource and energy savings.

For example, according to conventional technologies, images are outputted to paper through printing. However, a method has recently been proposed and used in which images are outputted so as to be displayed on a portable display such as electronic paper (ePaper) or a tablet PC. This eliminates the need for paper, leading to the saving in paper resources, which in turn saves electric power necessary to manufacture paper. In addition to that, the electronic paper is configured to keep displaying images thereon at very low power consumption. Therefore, the electronic paper can reduce power consumption as compared with a tablet PC.

In the meantime, image forming apparatuses having a variety of functions, such as copying, PC printing, scanning, faxing, and file server, have recently come into widespread use. Such image forming apparatuses are sometimes called "multifunction devices", "Multi-Functional Peripherals (MFPs)", or the like. A variety of schemes have recently been applied to image forming apparatus for ecology movement. One of the schemes is the action of coordinating with electronic paper.

The following method is proposed for example. A multifunction device detects the presence or absence of electronic paper in a predetermined area by performing data communication with the electronic paper. In the case where the electronic paper is present in the predetermined area of a document feeder or a paper feeder, the multifunction device starts executing a predetermined mode for processing which involves performing communication with the electronic paper (Japanese Laid-open Patent Publication No. 2010-166384).

An image forming apparatus having a configuration to perform varied processes in coordination with electronic paper reduces the need for paper, and also affords convenience to users. As the number of documents becomes larger, paper to be outputted is increased. In the case of electronic paper, however, even if the number of documents becomes larger, the amount of data does not increase as long as the data falls within the capacity of a memory. Further, a user of electronic paper can search for necessary information easily in a large number of documents.

An image forming apparatus is equipped with many functions. Accordingly, various screens are prepared in the image forming apparatus for setting operation and so on. If the image forming apparatus is further equipped with functions implemented by cooperating with electronic paper, the number of screens in the image forming apparatus is more and more increased. The increase in the number of screens forces a user to remember how to perform operations on such screens, which is cumbersome for the user. A developer of the image forming apparatus is also required to design new screens, which is cumbersome for the developer and involves the development costs.

SUMMARY

The present disclosure is directed to solve the problems pointed out above, and therefore, an object of an embodiment of the present invention is to solve the foregoing problems with screens for the case where an image forming apparatus works in coordination with electronic paper.

According to an aspect of the present invention, an apparatus for outputting an image includes a printer; a storage configured to store, therein, screen data on a screen in which a plurality of objects are provided and on which settings regarding a process for printing an image onto paper with the printer are made; an obtaining portion configured to obtain image data on a target image that is an image to be outputted; a display device configured to display, if a medium to which the target image is outputted is electronic paper, the screen based on the screen data in such a manner that an unrelated object is hidden or not placed, the unrelated object being included in the plurality of objects and being not related to the electronic paper; and an output portion configured to output the image data to the electronic paper based on conditions designated on the screen displayed in such a manner that the unrelated object is hidden or not placed.

Preferably, the display device displays the screen in a manner to hide or not to place the unrelated object such as an object for selecting a size of paper, an object for selecting a print side of paper, an object for selecting a type of paper, or an object for selecting a finish to be applied to a printed matter.

Alternatively, the apparatus may further include a detector configured to detect that a substance having a predetermined size range is placed in a position at which the paper is set to be conveyed to the printer or in a position at which the paper is ejected from the printer or a finisher, and also configured to detect that the medium is the electronic paper by receiving data indicating a predetermined state; wherein if the detector detects that the medium is the electronic paper, then the display device displays the screen with the unrelated object hidden or not placed.

According to another aspect of the present invention, an apparatus for inputting an image includes an image reader; a storage configured to store, therein, screen data on a screen in which a plurality of objects are provided and on which settings regarding a process for reading an image from paper with the image reader are made; a display device configured to display, if a medium having stored therein image data on a target image that is an image to be inputted is electronic paper, the screen based on the screen data in such a manner that an unrelated object is hidden or not placed, the unrelated object being included in the plurality of objects and being not related to the electronic paper; and an obtaining portion configured to obtain the image data from the electronic paper based on conditions designated on the screen displayed in such a manner that the unrelated object is hidden or not placed.

Preferably, the display device displays the screen in a manner to hide or not to place the unrelated object such as an object for selecting a size of the paper, an object for selecting a type of color or monochrome of an image read from the paper, an object for designating, as a surface to be read, both faces of the paper, or an object for selecting processing to be performed on the paper.

Alternatively, the apparatus may further include a detector configured to detect that a substance having a predetermined size range is placed in a position at which an original is set in an automatic document feeder of the image reader or in a glass plate of the image reader, and also configured to detect that the medium is the electronic paper by receiving data indicating a predetermined state; wherein if the detector detects that the medium is the electronic paper, then the display device displays the screen with the unrelated object hidden or not placed.

These and other characteristics and objects of the present invention will become more apparent by the following descriptions of preferred embodiments with reference to drawings.

BRIEF DESCRIPTION OF THE DRAWINGS

FIG. 8 is a diagram showing an example of attribute data.

FIG. 26 is a diagram showing an example of the display form of a configuration screen for copy job configurations.

FIG. 30 is a diagram showing an example of power-saving setting data.

DESCRIPTION OF THE PREFERRED EMBODIMENTS

Figure 1:
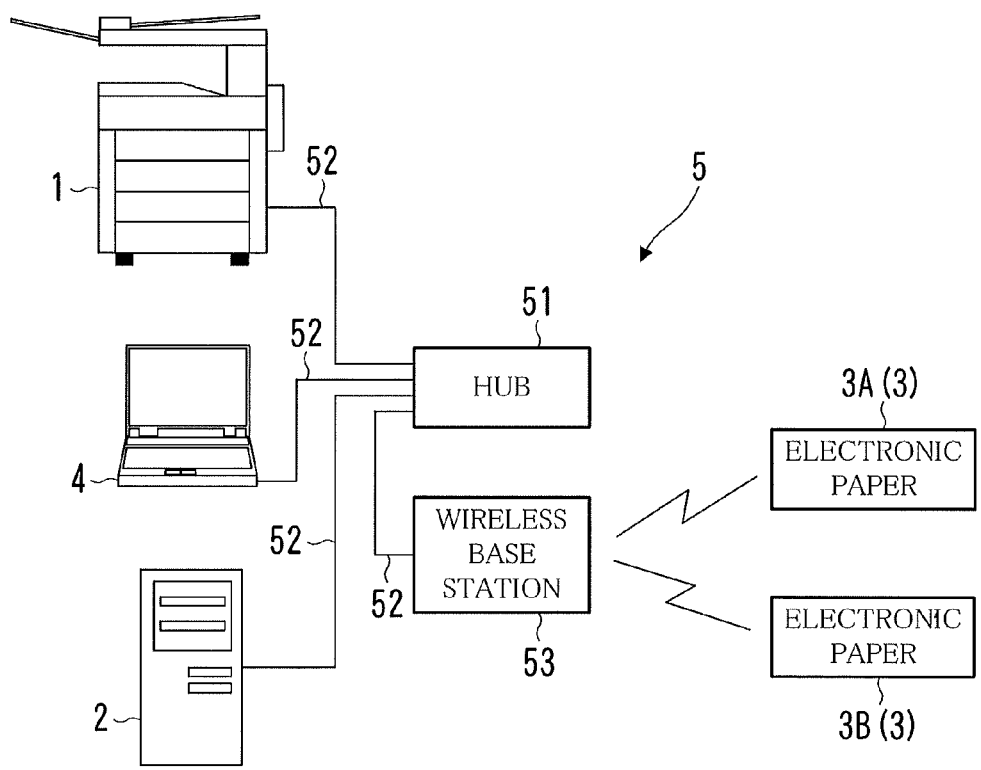
FIG. 1 is a diagram showing an example of the overall configuration of a network system.
Figure 2:
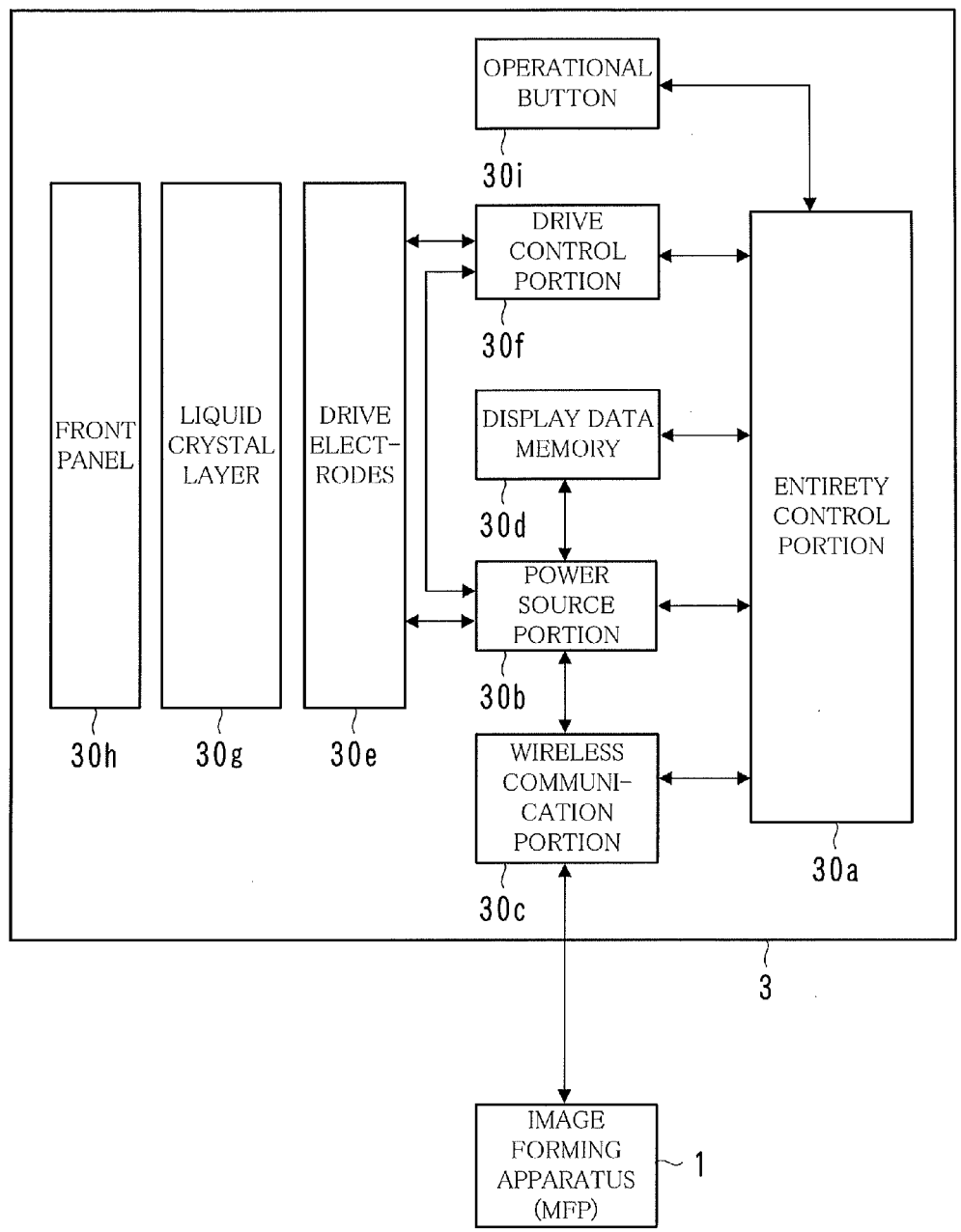
FIG. 2 is a diagram showing an example of the hardware configuration of electronic paper.
Figure 3:
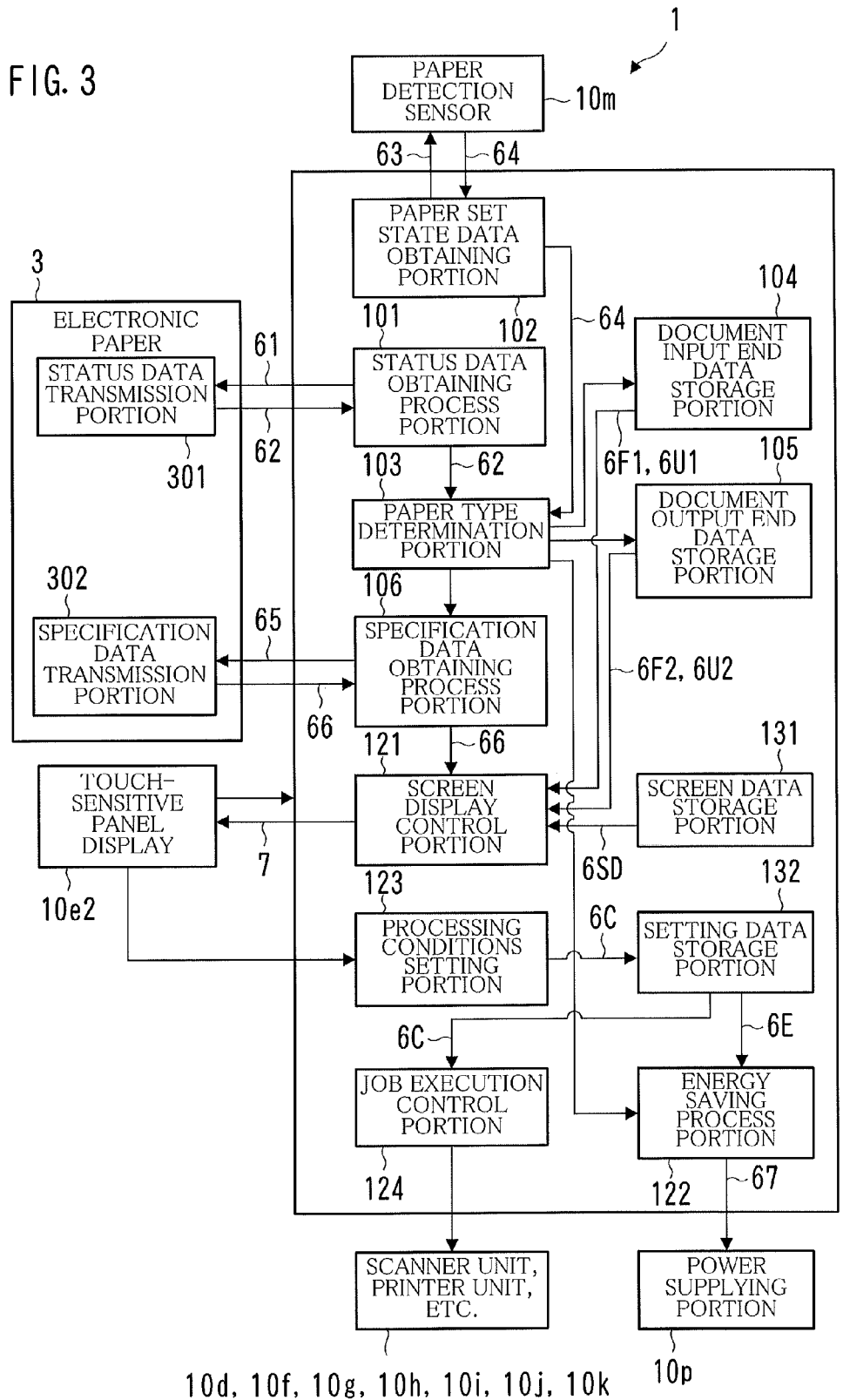
FIG. 3 is a diagram showing an example of the functional configuration of an image forming apparatus and the functional configuration of electronic paper.
Figure 4:
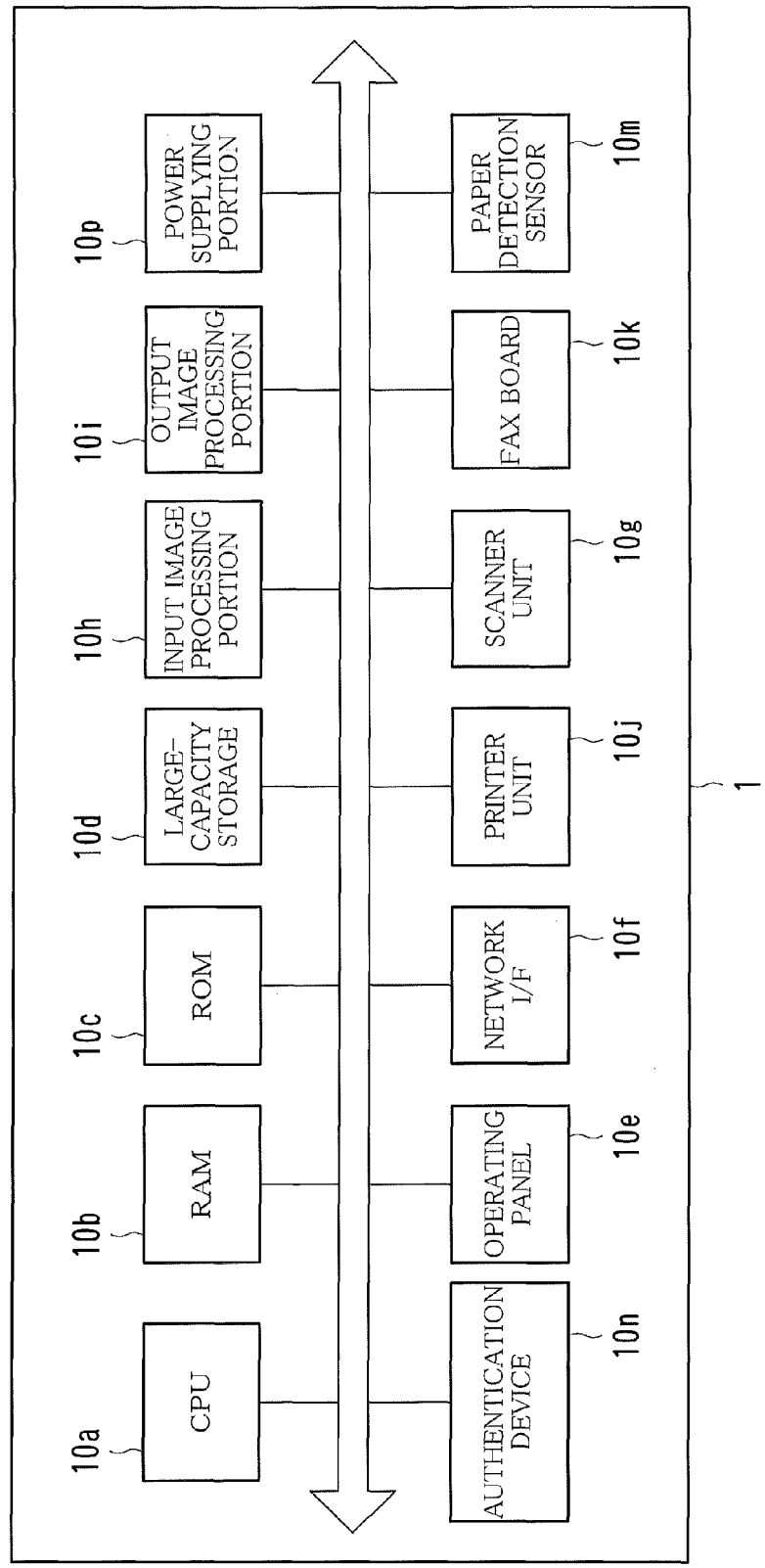
FIG. 4 is a diagram showing an example of the hardware configuration of an image forming apparatus.
Figure 5:
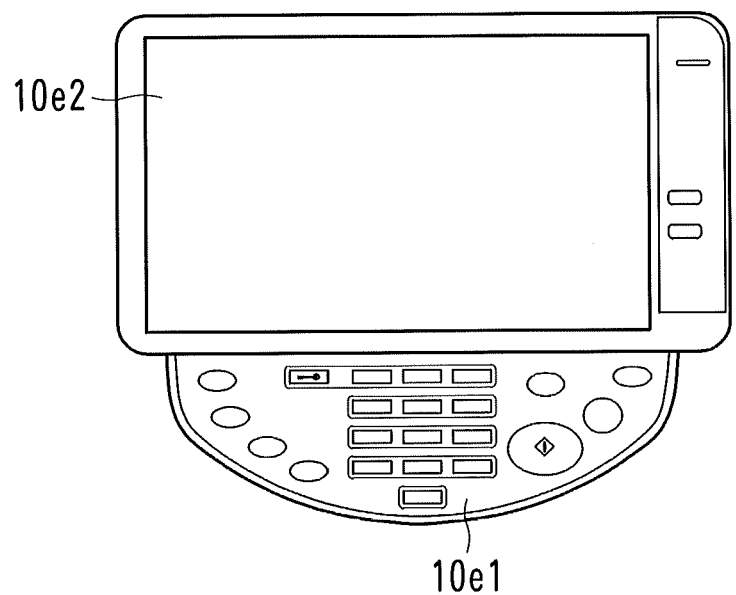
FIG. 5 is a diagram showing an example of an operating panel.
Figure 6:
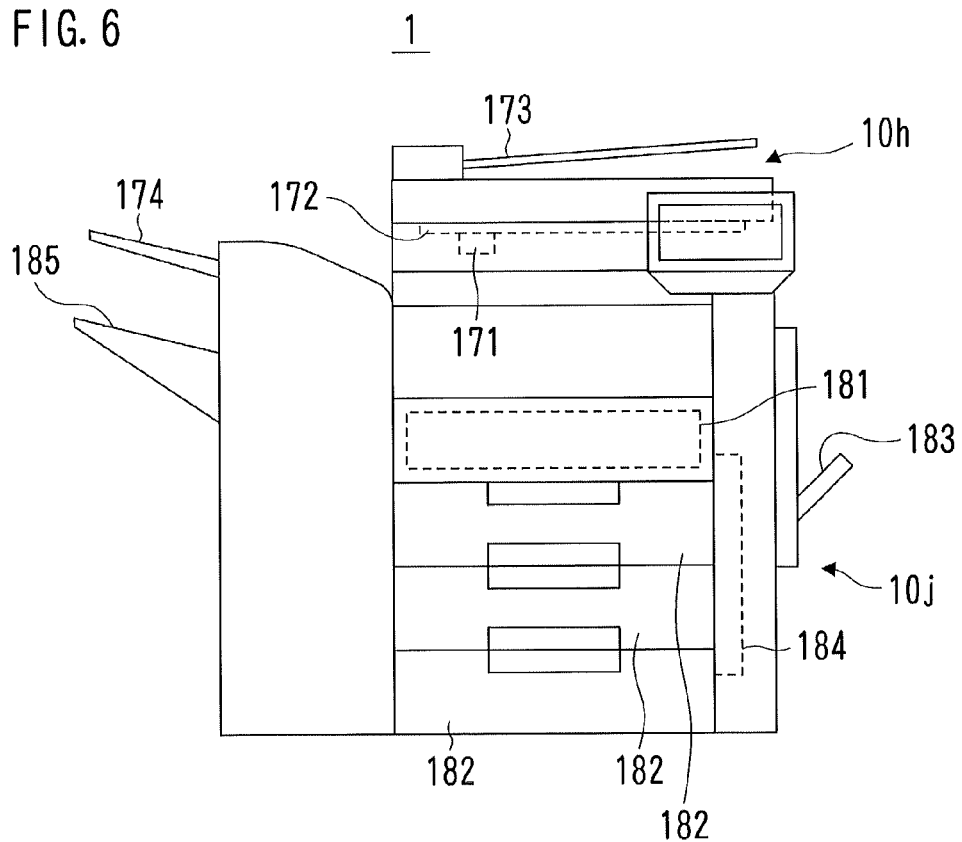
FIG. 6 is a diagram showing an example of the structure of an input image processing portion and a printer unit.

FIG. 1 is a diagram showing an example of the overall configuration of a network system NS; FIG. 2 is a diagram showing an example of the hardware configuration of electronic paper 3; FIG. 3 is a diagram showing an example of the functional configuration of an image forming apparatus 1 and the functional configuration of the electronic paper 3; FIG. 4 is a diagram showing an example of the hardware configuration of the image forming apparatus 1; FIG. 5 is a diagram showing an example of an operating panel 10e; and FIG. 6 is a diagram showing an example of the structure of an input image processing portion 10h and the structure of a printer unit 10j.

Referring to FIG. 1, the network system NS is configured of the image forming apparatus 1, a server 2, a plurality of pieces of electronic paper (ePaper) 3, a personal computer 4, a communication line 5, and so on.

The network system NS is installed in an organization such as a public office, business office, and school, and is used by members belonging to such an organization. The following is a description of an example in which the network system NS is used in an X-company.

The communication line 5 is one based on, for example, the Institute of Electrical and Electronics Engineers (IEEE) 802.3 standard or the IEEE 802.11 standard. The communication line 5 is configured of a hub 51, a twisted pair cable 52, a wireless base station 53, and so on. The image forming apparatus 1, the server 2, and the personal computer 4 are connected to the hub 51 via the twisted pair cable 52. The wireless base station 53 is also connected to the hub 51 via the twisted pair cable 52. Each piece of the electronic paper 3 is wirelessly connected to the wireless base station 53. The configuration discussed above enables the image forming apparatus 1, the server 2, each piece of the electronic paper 3, and the personal computer 4 to perform communication with one another via the communication line 5.

The server 2 is a server machine for providing users with various network services. Examples of the network services are: a service of sending or receiving a file in accordance with a File Transfer Protocol (FTP); a service of sending/receiving electronic mail; a distributed file system in accordance with a Web-based Distributed Authoring and Versioning (Web-DAV); and a directory service.

Referring to FIG. 2, the electronic paper 3 is configured of an entirety control portion 30a, a power source portion 30b, a wireless communication portion 30c, a display data memory 30d, drive electrodes 30e, a drive control portion 30f, a liquid crystal layer 30g, a front panel 30h, an operational button 30i, and so on.

The entirety control portion 30a serves to control overall operation of the electronic paper 3. The entirety control portion 30a also executes programs described later. The entirety control portion 30a may be a Central Processing Unit (CPU) or the like. The power source portion 30b serves to supply power to the individual portions of the electronic paper 3.

The wireless communication portion 30c performs communication with the image forming apparatus 1 based on the IEEE802.11 standard.

The display data memory 30d stores, therein, image data and information on image display sent from the image forming apparatus 1. The display data memory 30d also stores, therein, programs and data for implementing the functions of a status data transmission portion 301, a specification data transmission portion 302, and so on shown in FIG. 3. The whole or a part of the functions of the individual portions shown in FIG. 3 may be implemented by only hardware such as a circuit.

The liquid crystal layer 30g is a layer of liquid crystal molecules of individual colors of Red, Green, and Blue (RGB). The orientation of the liquid crystal molecules of the liquid crystal layer 30g is changed by the drive electrodes 30e. Thereby, an image is formed.

The drive control portion 30f controls the drive electrodes 30e in such a manner that an image is formed in accordance with instructions from the entirety control portion 30a.

The front panel 30h is a transparent film or glass plate that covers the front surface of the electronic paper 3.

The operational button 30i is used for a user to give a variety of commands to the electronic paper 3.

In this embodiment, the electronic paper 3 is liquid crystal-type electronic paper. Instead, however, other types of electronic paper such as microcapsule-type electronic paper or electrophoresis-type electronic paper may be used as the electronic paper 3.

For simplicity of explanation, the following description takes an example in which two pieces of electronic paper 3A and 3B are provided in the network system NS.

Referring back to FIG. 1, the personal computer 4 is a client to obtain a print service, a scan service, and other services provided by the image forming apparatus 1. The personal computer 4 has installed therein a driver for controlling the image forming apparatus 1. Instead of the personal computer 4, an information terminal such as a smartphone or a Personal Digital Assistant (PDA) may be used.

The image forming apparatus 1 is an image processing apparatus generally called a multifunction device or a Multi-Functional Peripheral (MFP). The image forming apparatus 1 is a device that integrates a variety of functions such as copying, PC printing, box function, faxing, and scanning into a single unit.

The PC printing function is a function to print an image onto paper based on print data received from the personal computer 4. The PC printing function is sometimes called a "network printer function" or a "network printing function".

The box function is a function in which storage areas called "personal boxes" or "boxes" are allocated and managed on a user-by-user basis. The personal boxes or boxes herein correspond to folders or directories in a personal computer. This function allows a user to save image data in his/her box on a file-by-file basis.

The image forming apparatus 1 is configured to use, as an image input source medium and an image output destination medium, a paper sheet, a film sheet, and the electronic paper 3. Hereinafter, a sheet such as the paper sheet and the film sheet is referred to as an "ordinary sheet" in order to be distinguished from the electronic paper 3.

Referring to FIG. 4, the image forming apparatus 1 is configured of a CPU 10a, a Random Access Memory (RAM) 10b, a Read Only Memory (ROM) 10c, a large-capacity storage 10d, the operating panel 10e, a network interface 10f, a scanner unit 10g, the input image processing portion 10h, an output image processing portion 10i, the printer unit 10j, a fax board 10k, a paper detection sensor 10m, an authentication device 10n, a power supplying portion 10p, and so on.

Referring to FIG. 5, the operating panel 10e is configured of a key entry portion 10e1, a touch-sensitive panel display 10e2, and so on.

The key entry portion 10e1 is a so-called hardware key, and includes a numeric keypad, a start key, a stop key, and a function key.

The touch-sensitive panel display 10e2 serves to display, for example, a screen for presenting messages or instructions to a user, a screen for allowing a user to input processing commands and conditions, and a screen showing the results of processing performed by the CPU 10a. The touch-sensitive panel display 10e2 also detects a position touched by user's finger, and transmits a signal indicating the detection result to the CPU 10a. A user operates the key entry portion 10e1 or the touch-sensitive panel display 10e2 while viewing the screens, which allows the user to input information and commands to the image forming apparatus 1.

The network interface 10f performs communication through the communication line 5 with the server 2, the electronic paper 3 and the personal computer 4 in accordance with a protocol, e.g., a Transmission Control Protocol/Internet Protocol (TCP/IP). An example of the network interface 10f is a Network Interface Card (NIC).

The scanner unit 10g log serves to optically read an image such as photographs, characters, pictures, charts, and the like that are recorded on an ordinary sheet, and to generate image data thereof. The scanner unit 10g log is configured to optically read both a full-color image and a monochrome image. The generated image data is Raw Data. As shown in FIG. 6, the scanner unit 10g includes a Charge Coupled Device (CCD) 171, a glass plate 172, an Auto Document Feeder (ADF) 173, and a document output tray 174. The ADF 173 serves to feed ordinary sheets placed on a document table one-by-one to the glass plate 172. The CCD 171 scans each of the ordinary sheets on the glass plate 172. The scanned ordinary sheet is outputted to the document output tray 174. The user may place the ordinary sheet directly on the glass plate 172 without using the ADF 173.

The input image processing portion 10h performs image processing on the image data obtained by the scanner unit 10g. For example, the input image processing portion 10h converts the obtained image data into Tagged Image File Format (TIFF) image data or Joint Photographic Experts Group (JPEG) image data.

The output image processing portion 10i performs image processing on image data of an image to be printed onto an ordinary sheet, so that bitmap image data is generated. For example, when 2-in-1 printing (2-up printing) is designated, the output image processing portion 10i generates bitmap image data whose resolution is so reduced as to allow images for two pages to be printed together on a single print side of one ordinary sheet. On the other hand, when monochrome printing of a color image is designated, the output image processing portion 10i generates bitmap image data having a grayscale.

The printer unit 10j serves to print, onto an ordinary sheet, a print target image based on the image data generated by the input image processing portion 10h or image data sent from the electronic paper 3 or the personal computer 4. The printer unit 10j is configured to print both a full color image and a monochrome image. Referring to FIG. 6, the printer unit 10j includes a print engine 181, a plurality of paper input trays 182, a manual feeder 183, a paper delivery mechanism 184, and a printed paper output tray 185. An example of the print engine 181 is an electrophotographic print engine for fixing toner onto an ordinary sheet. The paper input trays 182 are provided for each of sizes (A3 size, A4 size, etc.) of the ordinary sheet. The paper input trays 182 contain therein blank ordinary sheets. Placed on the manual feeder 183 are ordinary sheets onto which images are to be printed for manual paper feed. The paper delivery mechanism 184 serves to deliver ordinary sheets, selected by a user, one by one from the paper input trays 182 or the manual feeder 183 to the print engine 181. The print engine 181 serves to print an image onto an ordinary sheet fed thereto. The ordinary sheet onto which an image has been printed is ejected to the printed paper output tray 185.

The printer unit 10j is further provided with finishers such as a stapler, a puncher, and a Z-folding device. In the case where a finish condition is designated, the finishers staple sheets onto which images have been printed by the print engine 181, i.e., a printed matter, punch a hole in a printed matter, or fold a printed matter in Z in accordance with the finish condition. The printed matter that has undergone such a process by the finishers is ejected to the printed paper output tray 185.

The fax board 10k is a device to perform communication with a facsimile terminal via a fixed-line telephone network in accordance with a protocol such as G3.

The paper detection sensor 10m serves to detect whether or not an object having a size almost equal to the size of the ordinary sheet or the electronic paper 3 is placed on a specific place. Examples of the "specific place" herein are the glass plate 172 of the scanner unit 10g, the document table of the ADF 173, the document output tray 174, and the paper input trays 182, the manual feeder 183, and the printed paper output tray 185 of the printer unit 10j. As a method for detecting that an object is placed, a known method for detecting that paper is placed is used. For example, one or more convex portions such as buttons are formed on one plane surface. Further, a sensor for detecting that the convex portions are pressed is provided. When detecting that the convex portions are pressed, the sensor determines that an object is placed. Different detection methods may be used depending on the specific places.

The authentication device 10n is to identify a user and perform user authentication. The user authentication method may be a known method. Examples of the user authentication method are biometric authentication such as fingerprint authentication and voice print authentication. Alternatively, the user authentication may be performed by reading a user ID out of an IC card of a user. Alternatively, the user authentication may be performed by obtaining an identifier of the personal computer 4 operated by the user. Another configuration is also possible in which, if the server 2 provides a directory service, the server 2 may perform user authentication by prompting a user to enter his/her user ID and password.

The ROM 10c or the large-capacity storage 10d stores, therein, programs and data for implementing the functions of a status data obtaining process portion 101, a paper set state data obtaining portion 102, a paper type determination portion 103, a document input end data storage portion 104, a document output end data storage portion 105, a specification data obtaining process portion 106, a screen display control portion 121, an energy saving process portion 122, a processing conditions setting portion 123, a job execution control portion 124, a screen data storage portion 131, a setting data storage portion 132, and so on, all of which are shown in FIG. 3. These programs and data are loaded into the RAM 10b as necessary, whereupon the programs are executed by the CPU 10a.

The ROM 10c or the large-capacity storage 10d also has installed therein applications for managing the image forming apparatus 1. Examples of the applications are: an application for user authentication; an application for counting the number of times of printing and facsimile transmission of an image on a user-by-user basis; an application for managing a status of the subject image forming apparatus 1; an application for customizing a screen on a user-by-user basis; an application for managing document data; an application for billing each department of the X-company; and an application for managing/recording transmission history and transmission details.

The power supplying portion 10p serves to, in accordance with a command and so on from the CPU 10a, supply power to the individual portions, i.e., the CPU 10a through the authentication device 10n shown in FIG. 4.

The user can input an image from both an ordinary sheet and the electronic paper 3 to the image forming apparatus 1. The user can also output an image to both an ordinary sheet and the electronic paper 3. Since how to use the ordinary sheet is the same as conventional methods, descriptions thereof are omitted.

When inputting an image from the electronic paper 3, the user places the electronic paper 3 on the glass plate 172 of the scanner unit 10g, the document table of the ADF 173, or the document output tray 174 with a read-out target image displayed on the electronic paper 3. In particular, placing the electronic paper 3 on the glass plate 172 or the document table is operation similar to the operation for the case of reading an image out of the ordinary sheet.

When outputting an image to the electronic paper 3, the user places the electronic paper 3 on the paper input trays 182 of the printer unit 10j, the manual feeder 183, or the printed paper output tray 185 with no image displayed on the electronic paper 3. In particular, placing the electronic paper 3 on the paper input trays 182 or the manual feeder 183 is operation similar to the operation for the case of printing an image onto an ordinary sheet where nothing is drawn.

In the case where the type of a medium from which an image is read (inputted), or, alternatively, the type of a medium to which an image is outputted is electronic paper, the image forming apparatus 1 edits a configuration screen for ordinary sheet appropriately and displays the edited configuration screen. To be more specific, the image forming apparatus 1 displays the configuration screen for ordinary sheet with unnecessary objects hidden appropriately. Such a configuration screen for ordinary sheet may be one of conventional configuration screens.

Further, the image forming apparatus 1 attempts to save power appropriately depending on the type of an image input source medium and the type of an image output destination medium.

The individual portions shown in FIG. 3 implement the processing for displaying a configuration screen and the processing for saving power. Descriptions are provided below of the processing details of the individual portions shown in FIG. 3.

[Screen Display Processing]

Figure 7:
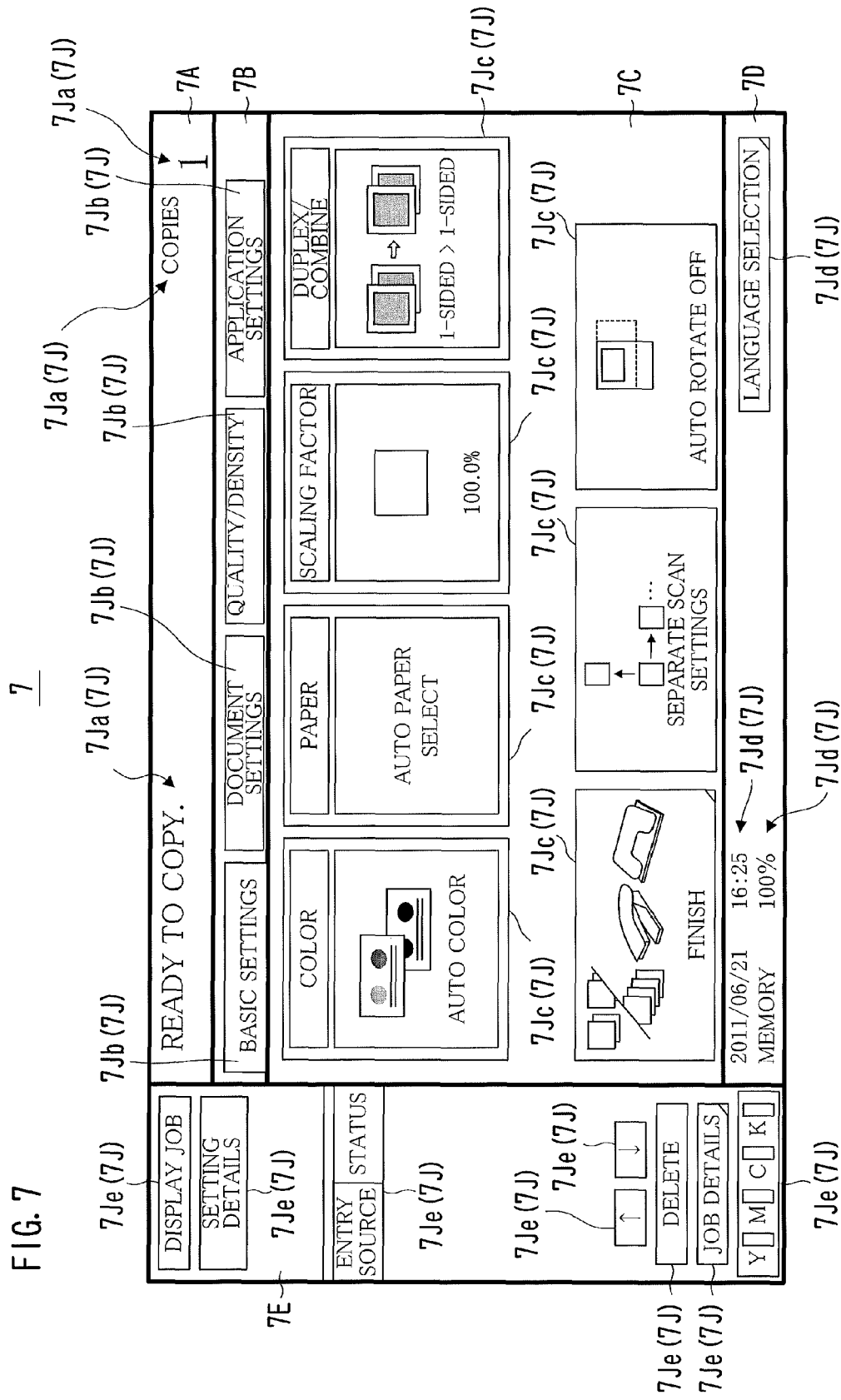
FIG. 7 is a diagram showing an example of the layout of a configuration screen.
Figure 9:
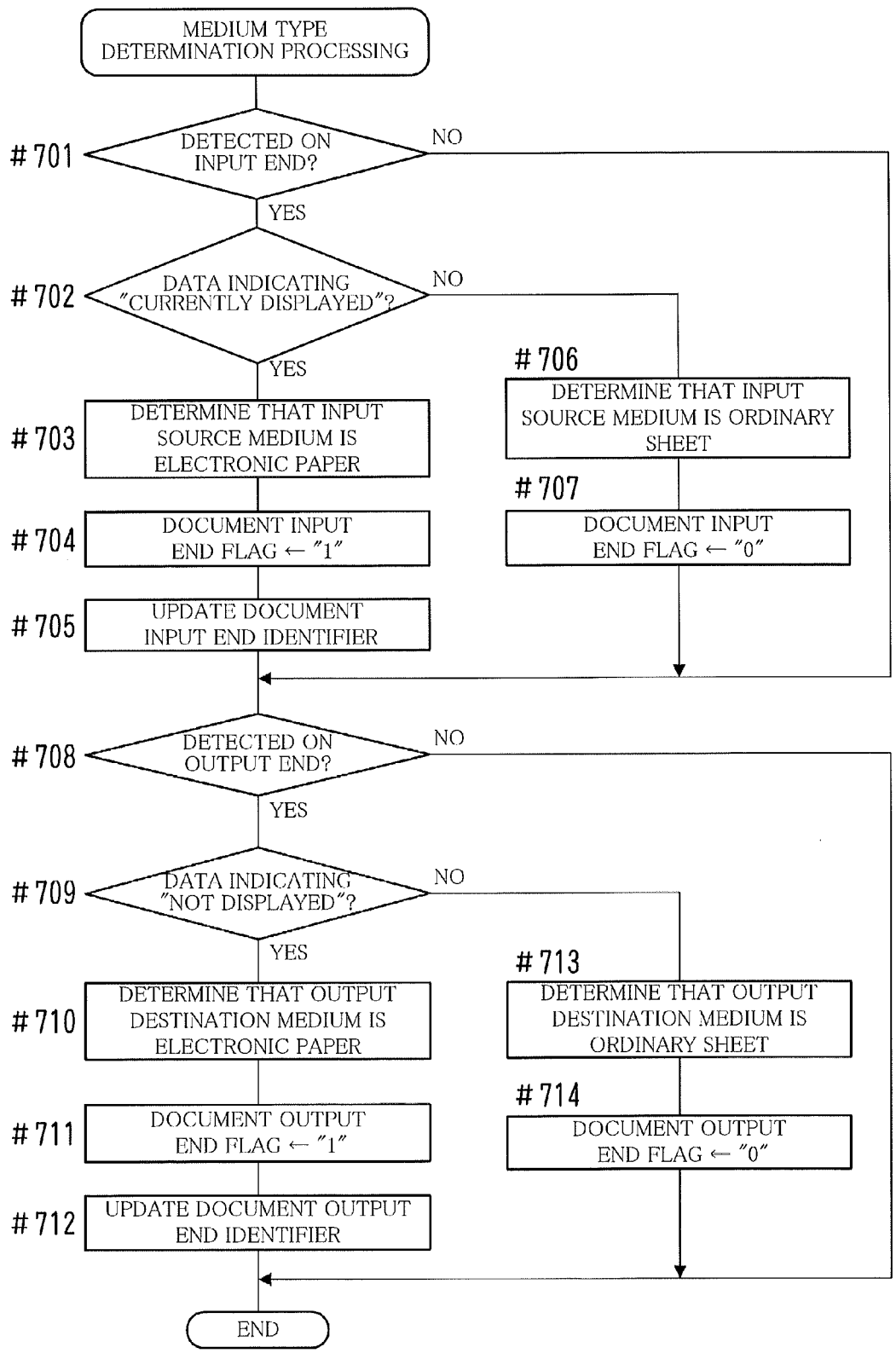
FIG. 9 is a flowchart depicting an example of medium type determination processing.
Figure 10:
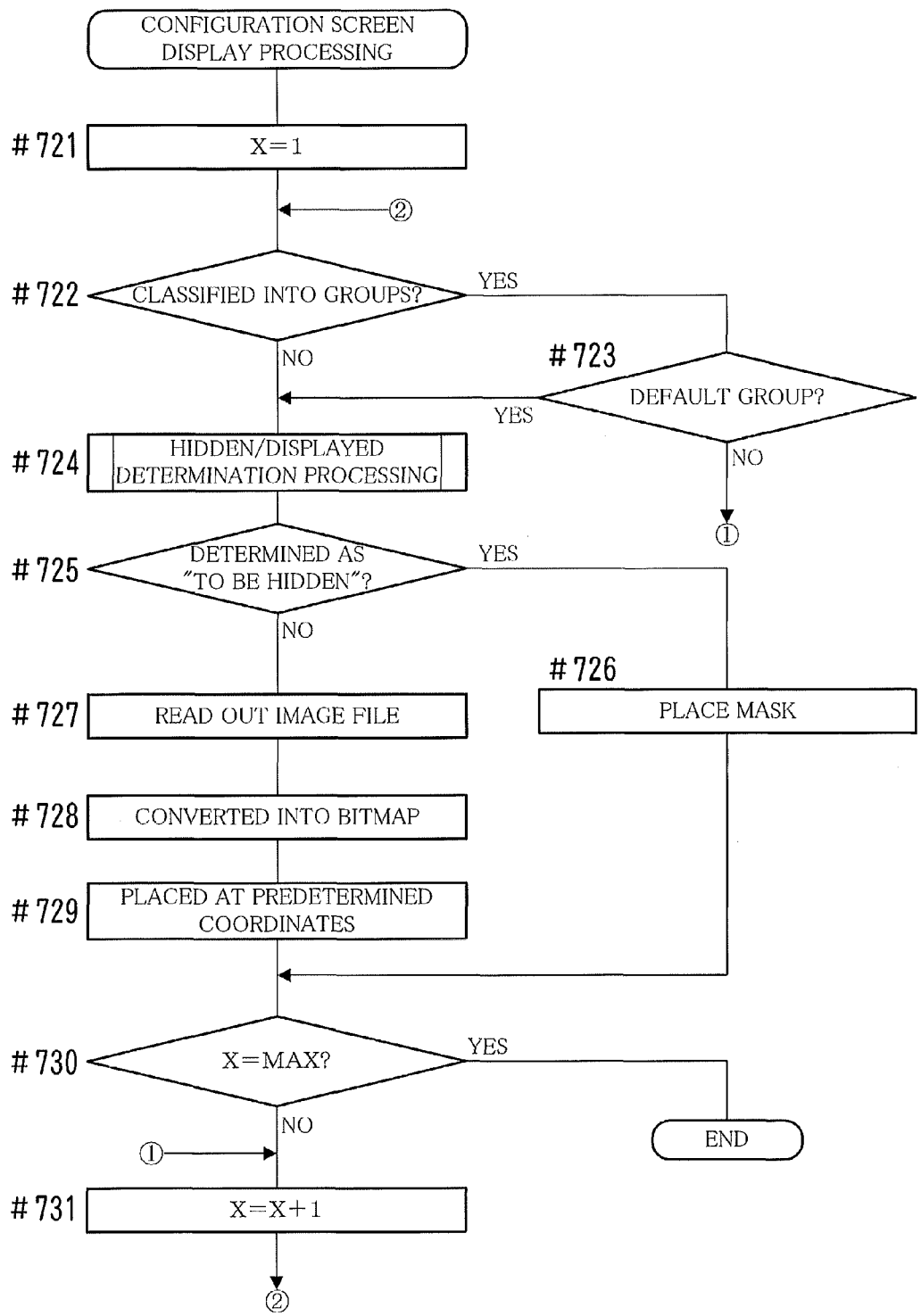
FIG. 10 is a flowchart depicting an example of configuration screen display processing.
Figure 11:
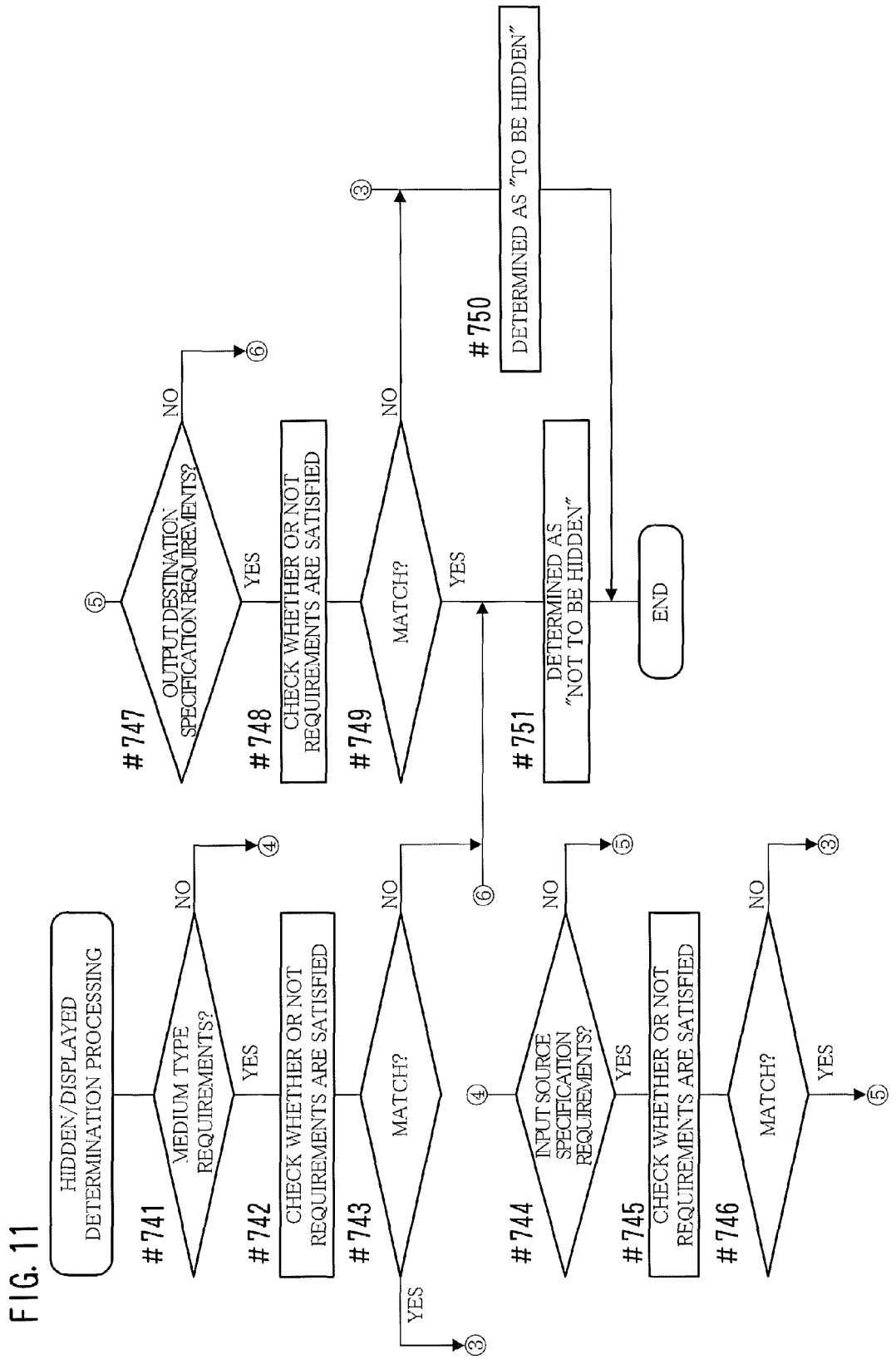
FIG. 11 is a flowchart depicting an example of hidden/displayed determination processing.

FIG. 7 is a diagram showing an example of the layout of a configuration screen 7; FIG. 8 is a diagram showing an example of attribute data 6PD; FIG. 9 is a flowchart depicting an example of medium type determination processing; FIG. 10 is a flowchart depicting an example of configuration screen display processing; and FIG. 11 is a flowchart depicting an example of hidden/displayed determination processing.

In general, a screen includes varied objects thereon. In this embodiment, an example is described in which the configuration screen 7 as shown in FIG. 7 is displayed on the touch-sensitive panel display 10e2.

The configuration screen 7 is used for a user to primarily specify job settings. The configuration screen 7 is prepared for each type of job. The following description provides an example of the configuration screen 7 for a job of copying an image from an ordinary sheet or electronic paper 3 into another ordinary sheet or another piece of electronic paper 3, namely, a so-called copy job.

The configuration screen 7 includes a message area 7A, a tab area 7B, a job configuration area 7C, a status information area 7D, and a job operation area 7E.

In the message area 7A, objects 7Ja such as text representing a message to a user are provided.

As for a copy job, various items to be set are classified into groups in advance. In this embodiment, the items to be set are grouped into any of the four groups of "basic settings", "document settings", "quality/density", and "application settings". The four groups are detailed one by one.

In the tab area 7B, objects 7Jb such as tabs corresponding to the foregoing groups are provided.

In the job configuration area 7C, objects 7Jc such as buttons for a user to make settings on items of a group corresponding to a tab pressed by him/her are provided.

If the number of objects 7Jc for items of one group is excessively large, the objects 7Jc cannot be displayed in the job configuration area 7C at one time. To cope with this, items of one group are further classified into small groups for each category, and the objects 7Jc are laid out for each small group in some cases. Stated differently, there are prepared a plurality of groups each of which includes a plurality of objects 7Jc. When any one of the groups is selected, objects 7Jc of the selected group are laid out in the job configuration area 7C.

In the status information area 7D, objects 7Jd such as text are provided which represent a state or environment of the image forming apparatus 1, e.g., an available space of the RAM 10b, or the current date and time.

In the job operation area 7E, objects 7Je are provided. Examples of the objects 7Je are text indicating information on job in queue and a button for a user to operate a job in queue.

Hereinafter, the objects 7Ja-7Je are collectively referred to as an "object 7J".

When a predetermined event occurs, e.g., when a predetermined command is entered, the screen display control portion 121 shown in FIG. 3 performs processing for displaying the configuration screen 7 in the touch-sensitive panel display 10e2 in coordination with the individual portions shown in FIG. 3 in the following manner.

The screen data storage portion 131 stores, for each configuration screen 7, screen data 6SD for displaying the configuration screen 7 in the touch-sensitive panel display 10e2. The screen data 6SD is data including, for each of the objects 7J provided in the configuration screen 7, an image file 6GF for rendering the corresponding object 7J, and attribute data 6PD indicating attributes of the individual objects 7J in the configuration screen 7.

The image file 6GF is image data in such a format as a Graphics Interchange Format (GIF) or a bitmap. When the object 7J is text (letter string), the image file 6GF may be text data or rich text data.

As shown in FIG. 8, the attribute data 6PD has records each of which corresponds to one object 7J in the configuration screen 7.

Referring to a record corresponding to any one of the objects 7J, the item "object identifier" is identification (ID) for distinguishing the object 7J concerned from the other objects 7J. The item "object file name" is a file name of an image file 6GF for the object 7J concerned. The item "coordinates" are coordinates of the position at which the object 7J concerned is placed in the configuration screen 7.

The item "medium type requirements" are requirements regarding the type of an input source medium and the type of an output destination medium for the case where the object 7J concerned is to be hidden. To be specific, when the medium type requirements indicate "input source=electronic paper", the object 7J concerned is to be hidden as long as the type of the input source medium is electronic paper. When the medium type requirements indicate "output destination=electronic paper", the object 7J concerned is to be hidden as long as the type of the output destination medium is electronic paper.

The item "input source specification requirements" are requirements on specifications of the input source medium for the case where the type of the image input source medium is electronic paper. To be specific, when the specifications of the electronic paper 3 correspond to the input source specification requirements, the object 7J is displayed. Otherwise, the object 7J is hidden. Likewise, the item "output destination specification requirements" are requirements on specifications of the output destination medium for the case where the type of the image output destination medium is electronic paper.

If the object 7J concerned corresponds to an object for the job configuration area 7C, then the object 7J includes a group identifier. The item "group identifier" is identification (ID) for distinguishing a group to which the object 7J belongs from the other groups.

Other than those above, the screen data storage portion 131 stores as necessary, for each of the objects 7J, data indicating an identifier of a module or a procedure to be executed for the case where the object 7J concerned is selected.

Referring back to FIG. 3, the status data obtaining process portion 101 requests status data from each piece of the electronic paper 3 around the image forming apparatus 1 by sending status inquiry data 61 thereto, and obtains the status data. The "status data" is data indicating the current status (condition) of the electronic paper 3. The following is a description of an example in which the status data obtaining process portion 101 requests, from the electronic paper 3, status data indicating that an image is displayed in the front panel 30h or not.

In the electronic paper 3, when receiving the status inquiry data 61, the status data transmission portion 301 checks whether or not an image is currently displayed in the front panel 30h of the subject electronic paper 3. The status data transmission portion 301 then sends, to the image forming apparatus 1, status data 62 indicating the check result ("currently displayed" or "not displayed") and the identifier of the subject electronic paper 3, e.g., a Media Access Control (MAC) address or an Internet Protocol (IP) address. In this way, the status data 62 is sent from each piece of the electronic paper 3 to the image forming apparatus 1. Since the network system NS has two pieces of electronic paper 3 (3A and 3B) as described above, the status data obtaining process portion 101 obtains two sets of status data 62 at most in this case. When only one piece of the electronic paper 3 is turned ON, only one set of status data 62 is obtained in the image forming apparatus 1. When both pieces of the electronic paper 3 are turned OFF, no status data 62 is obtained therein. The same is similarly applied to the specification data 66 discussed below.

With the image forming apparatus 1, at the same time with the processing for obtaining the status data 62 by the status data obtaining process portion 101, the paper set state data obtaining portion 102 inquires of the paper detection sensor 10m whether or not an object is placed in the specific places described earlier. At this time, the paper set state data obtaining portion 102 sends paper set state inquiry data 63 to the paper detection sensor 10m.

In response to the receipt of the paper set state inquiry data 63, the paper detection sensor 10m checks whether or not an object is placed on each of the specific places. The paper detection sensor 10m sends, to the image forming apparatus 1, detection result data 64 indicating, among the specific places, the detected place on which an object is placed. In this way, the paper set state data obtaining portion 102 obtains the detection result data 64.

When the status data 62 is obtained from the status data transmission portion 301, and when the detection result data 64 is obtained from the paper detection sensor 10m, the paper type determination portion 103 of the image forming apparatus 1 determines, based on the sets of data obtained, the type of an image input source medium and the type of an image output destination medium. The following description gives an example of such determination processing with reference to the flowchart of FIG. 9.

If any of the sets of the detection result data 64 shows any one of the specific places of the glass plate 172, the document table of the ADF 173, and the document output tray 174 of the scanner unit 10g, i.e., any one of the specific places of the document input end (Yes in Step #701 of FIG. 9), and at the same time, if any of the sets of the status data 62 shows "currently displayed" (Yes in Step #702), then the paper type determination portion 103 determines that the type of the input source medium is electronic paper (Step #703).

Meanwhile, the document input end data storage portion 104 stores, therein, data on input source medium, i.e., document input end medium. To be specific, the document input end data storage portion 104 stores a document input end flag 6F1 and document input end identification data 6U1. The document input end flag 6F1 indicates that the type of a document input end medium is electronic paper, or, alternatively, that the type of a document input end medium is an ordinary sheet. To be specific, the value of "1" of the document input end flag 6F1 means that the type of a document input end medium is electronic paper. The value of "0" of the document input end flag 6F1 means that the type of a document input end medium is an ordinary sheet. If the type of a document input end medium is electronic paper, then the document input end identification data 6U1 shows an identifier of electronic paper 3 used as the document input end medium.

When determining that the type of the input source medium is electronic paper, the paper type determination portion 103 updates the value of the document input end flag 6F1 with the value of "1" (Step #704). Further, the paper type determination portion 103 updates the value of the document input end identification data 6U1 to indicate an identifier of the status data 62 where "currently displayed" is indicated (Step #705).

On the other hand, if no status data 62 indicates "currently displayed" (No in Step #702), then the paper type determination portion 103 determines that the type of the input source medium is an ordinary sheet (Step #706). The paper type determination portion 103 then updates the value of the document input end flag 6F1 with the value of "0" (Step #707).

If any of the sets of the detection result data 64 shows any one of the specific places of the paper input trays 182, the manual feeder 183, and the printed paper output tray 185 of the printer unit 10j, i.e., any one of the specific places of the document output end (Yes in Step #708), and at the same time, if any of the sets of the status data 62 shows "not displayed" (Yes in Step #709), then the paper type determination portion 103 determines that the type of the output destination medium is electronic paper (Step #710).

Meanwhile, the document output end data storage portion 105 stores, therein, data on output destination medium. To be specific, the document output end data storage portion 105 stores a document output end flag 6F2 and document output end identification data 6U2. The document output end flag 6F2 indicates whether or not the type of a document output end medium is electronic paper. To be specific, the value of "1" of the document output end flag 6F2 means that the type of a document output end medium is electronic paper. The value of "0" of the document output end flag 6F2 means that the type of a document output end medium is an ordinary sheet. If the type of a document output end medium is electronic paper, then the document output end identification data 6U2 shows an identifier of electronic paper 3 used as the document output end medium.

When determining that the type of the output destination medium is electronic paper, the paper type determination portion 103 updates the value of the document output end flag 6F2 with the value of "1" (Step #711). Further, the paper type determination portion 103 updates the value of the document output end identification data 6U2 to indicate an identifier of the status data 62 where "not displayed" is indicated (Step #712).

On the other hand, if no status data 62 indicates "not displayed" (No in Step #709), then the paper type determination portion 103 determines that the type of the output destination medium is an ordinary sheet (Step #713). The paper type determination portion 103 then updates the value of the document output end flag 6F2 with the value of "0" (Step #714).

Referring back to FIG. 3, if the paper type determination portion 103 determines that at least one of the input source medium and the output destination medium is electronic paper, then the specification data obtaining process portion 106 requests specification data from the electronic paper 3 and obtains the specification data therefrom by sending specification inquiry data 65 to the electronic paper 3. The "specification data" herein is data indicating the specifications of the electronic paper 3.

In the electronic paper 3, when receiving the specification inquiry data 65, the specification data transmission portion 302 sends, as the specification data 66, data indicating the specifications and the identifier of the subject electronic paper 3 to the image forming apparatus 1.

In the image forming apparatus 1, the screen display control portion 121 arranges the configuration screen 7 based on the foregoing data, and displays the resultant configuration screen 7 on the touch-sensitive panel display 10e2. The foregoing data includes the specification data 66 of each piece of the electronic paper 3, the document input end flag 6F1, the document input end identification data 6U1, the document output end flag 6F2, the document output end identification data 6U2, and the screen data 6SD. The specification data 66 is obtained by the specification data obtaining process portion 106. The document input end flag 6F1 and the document input end identification data 6U1 are stored in the document input end data storage portion 104. The document output end flag 6F2 and the document output end identification data 6U2 are stored in the document output end data storage portion 105. The screen data 6SD is stored in the screen data storage portion 131.

When a configuration screen 7 is newly displayed, the screen display control portion 121 performs processing according to the procedure shown in FIG. 10.

The screen display control portion 121 generates bitmap data of a screen on which objects 7J corresponding to the attribute data 6PD (see FIG. 8) of the screen data 6SD in the configuration screen 7 are placed. The processing for placing the objects 7J is described, taking an example in which "X" of FIG. 10 is "K", i.e., an example of the K-th object 7J.

If a record for the K-th object 7J shows no group identifier (No in Step #722 of FIG. 10), or, alternatively, if the record for the K-th object 7J shows a default group identifier (Yes in Step #722 and Yes in Step #723), then it is determined whether or not the K-th object 7J is to be hidden (Step #724). The determination processing is performed in the steps shown FIG. 11.

If the record shows medium type requirements (Yes in Step #741 of FIG. 11), then the screen display control portion 121 checks whether or not the type of the input source medium and the type of the output destination medium match the medium type requirements (Step #742). Note that the type of the input source medium is shown in the document input end flag 6F1, and the type of the output destination medium is shown in the document output end flag 6F2. Thus, it is known whether or not the medium type requirements are satisfied by checking the values of the document input end flag 6F1 and the document output end flag 6F2.

If at least one of the medium type requirements is satisfied (Yes in Step #743), then the screen display control portion 121 determines that the K-th object 7J is to be hidden (Step #750).

To be specific, if "input source=electronic paper" is shown as the medium type requirements, and, at the same time, if the document input end flag 6F1 shows the value of "1", then it is determined that the K-th object 7J is to be hidden. Alternatively, if "output destination=electronic paper" is shown as the medium type requirements, and, at the same time, if the document output end flag 6F2 shows the value of "1", then it is determined that the K-th object 7J is to be hidden. Yet alternatively, if both of "input source=electronic paper" and "output destination=electronic paper" are shown as the medium type requirements, and, at the same time, if at least one of them is satisfied, in other words, if at least one of the document input end flag 6F1 and the document output end flag 6F2 shows the value of "1", then it is determined that the K-th object 7J is to be hidden.

On the other hand, if the medium type requirements are not satisfied (No in Step #743), then the screen display control portion 121 determines that the K-th object 7J is not to be hidden (Step #751).

In contrast, if the record shows no medium type requirements (No in Step #741 of FIG. 11), then the check on the input source specification requirements and the check on the output destination specification requirements are performed as follows.

If the record shows input source specification requirements, and, at the same time, if the type of the input source medium is electronic paper (Yes in Step #744), then the screen display control portion 121 checks whether or not the specifications of the input source electronic paper 3 satisfy the input source specification requirements shown in the record (Step #745). Stated differently, a check is made as to whether or not the specifications indicated in the specification data 66 obtained from the subject electronic paper 3 satisfy the input source specification requirements shown in the record. Note that the subject electronic paper 3 is identifiable based on the identifier shown in the document input end identification data 6U1. The specification data 66 showing the identified identifier also shows the specifications of the subject electronic paper 3.

If the specifications of the subject electronic paper 3 do not satisfy the input source specification requirements (No in Step #746), then the screen display control portion 121 determines that the K-th object 7J is to be hidden (Step #750).

If the record shows output destination specification requirements, and, at the same time, if the type of the output destination medium is electronic paper (Yes in Step #747), then the screen display control portion 121 checks whether or not the specifications of the output destination electronic paper 3 satisfy the output destination specification requirements shown in the record (Step #748). Stated differently, a check is made as to whether or not the specifications indicated in the specification data 66 obtained from the subject electronic paper 3 satisfy the output destination specification requirements. Note that the subject electronic paper 3 is identifiable based on the identifier shown in the document output end identification data 6U2. The specification data 66 showing the identified identifier also shows the specifications of the subject electronic paper 3.

If the specifications of the subject electronic paper 3 do not satisfy the output destination specification requirements (No in Step #749), then the screen display control portion 121 determines that the K-th object 7J is to be hidden (Step #750).

Referring back to FIG. 10, if it is not determined that the K-th object 7J is to be hidden (No in Step #725), then the screen display control portion 121 reads out the image file 6GF of the object file name indicated in the record, converts the image file 6GF into bitmap data (Step #727 and Step #728), and places the K-th object 7J at the position represented by the coordinates indicated in the record (Step #729).

On the other hand, if it is determined that the K-th object 7J is to be hidden (Yes in Step #725), then the screen display control portion 121 places a masking object 7Jm instead of the K-th object 7J at the position represented by the coordinates of the K-th object 7J (Step #726). The masking object 7Jm is an image having the size enough to cover the K-th object 7J.

The screen display control portion 121 performs processing that is similar to the foregoing processing on the object 7J corresponding to the K-th record on each of the remaining objects 7J. Thereby, bitmap data on the entirety of the configuration screen 7 is generated.

The screen display control portion 121 displays the configuration screen 7 on the touch-sensitive panel display 10e2.

Thereafter, when another group is selected, the screen display control portion 121 replaces the objects 7Jc in the job configuration area 7C with objects 7Jc of the selected group, and generates bitmap data on the entirety of the configuration screen 7, or, bitmap data on the job configuration area 7C, so that the configuration screen 7 is updated.

Meanwhile, when a plurality of objects 7J adjacent to each other are to be hidden, one masking object 7Jm having a size enough to cover the plurality of objects 7J may be placed.

FIGS. 12-29 are diagrams each of which shows an example of the display form of the configuration screen 7 for copy job configurations. Descriptions are provided below, with reference to FIGS. 12-29, of examples showing how to edit the configuration screen 7 depending on the type of the input source medium and the type of the output destination medium.

Figure 12:
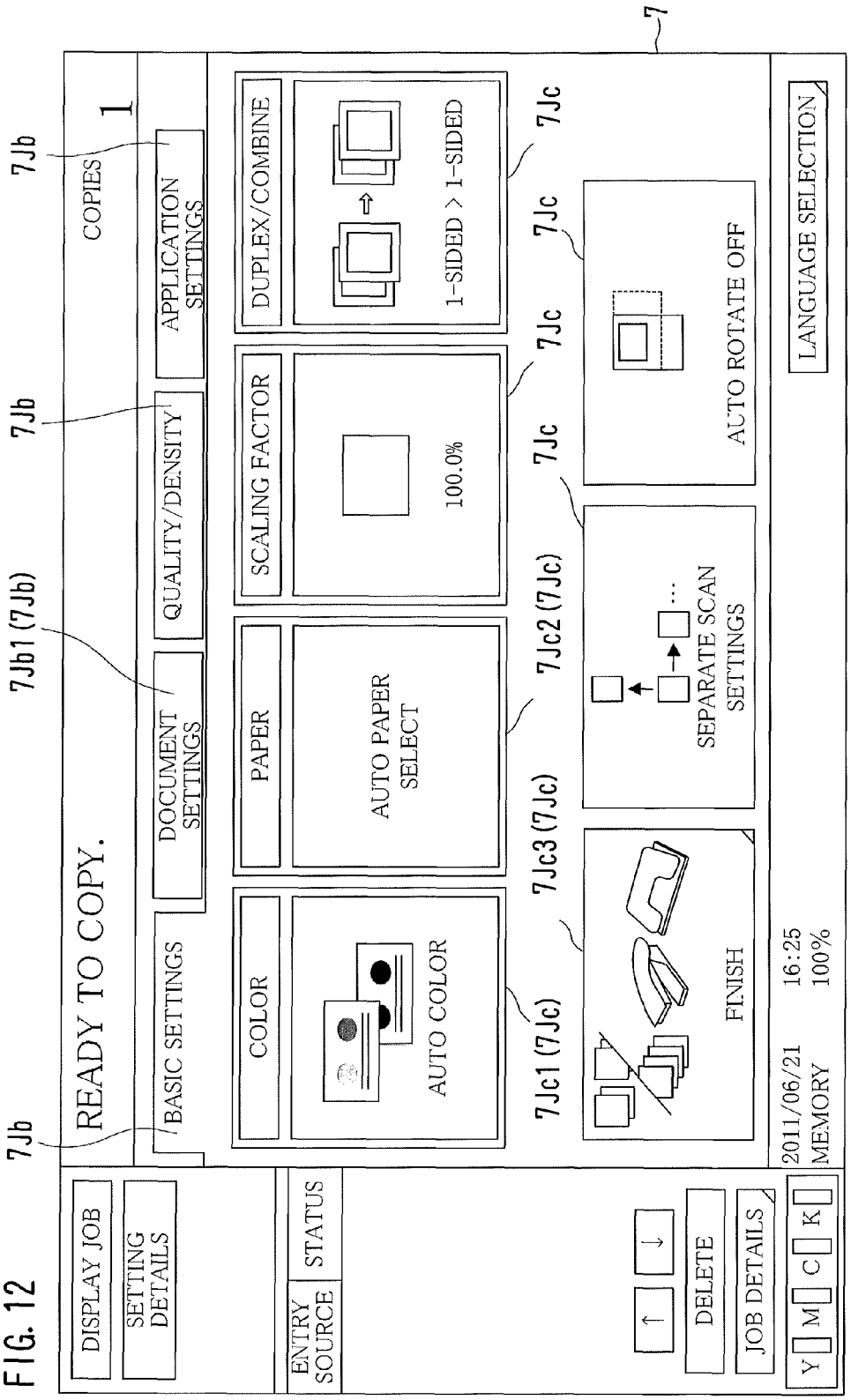
FIG. 12 is a diagram showing an example of the display form of a configuration screen for copy job configurations.

In the case where the group of basic settings is set as the default group, the screen display control portion 121 newly displays the configuration screen 7 without hiding the objects 7J as shown in FIG. 12 as long as both the type of an input source medium and the type of an output destination medium are ordinary sheets. Hereinafter, the case where both the type of the input source medium and the type of the output destination medium are ordinary sheets is referred to as "at normal copying".

Figure 13:
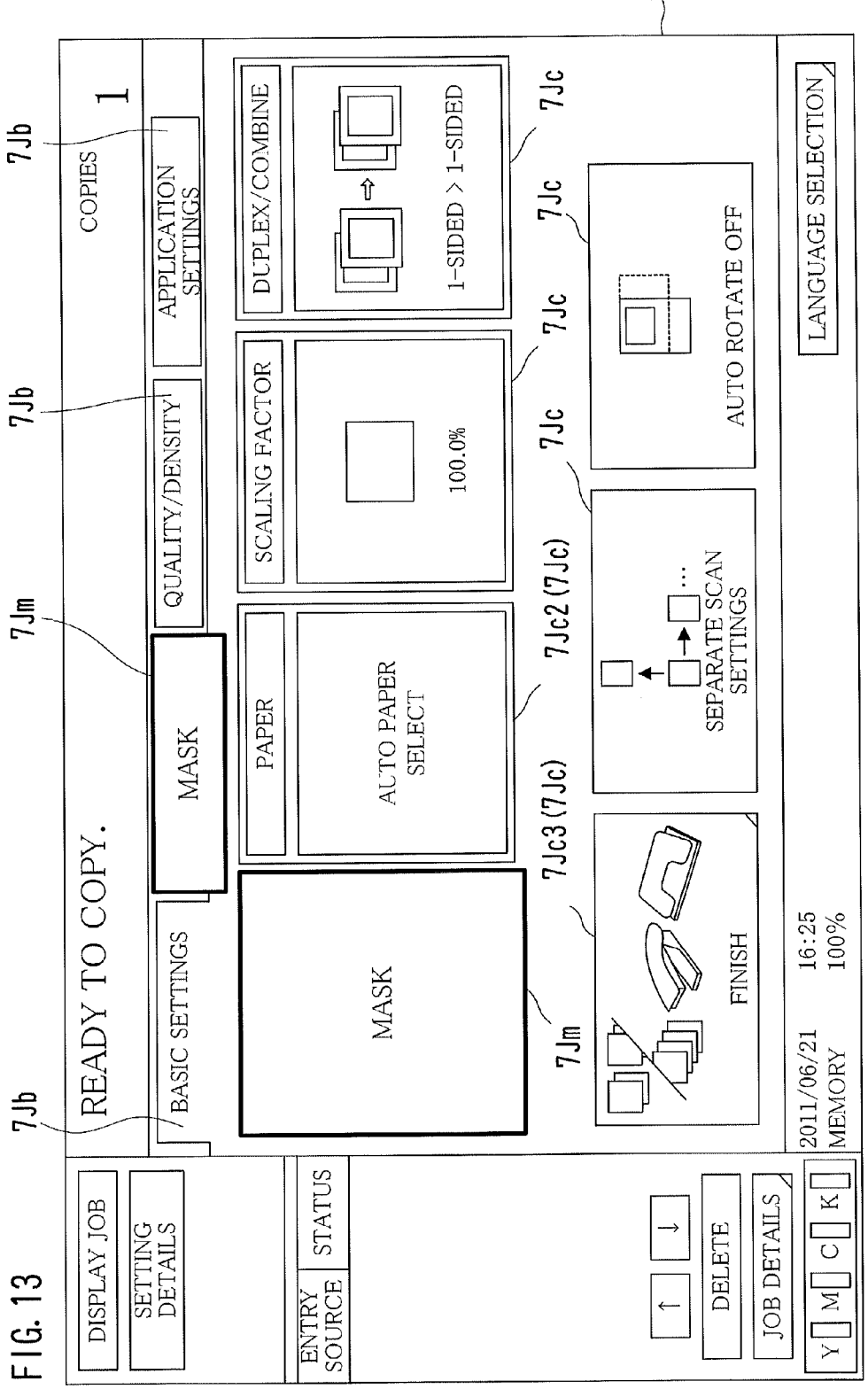
FIG. 13 is a diagram showing an example of the display form of a configuration screen for copy job configurations.

If only the type of an input source medium is electronic paper, then the screen display control portion 121 covers, as shown in FIG. 13, an object 7Jb1 for selecting the document settings group and an object 7Jc1 for selecting the color group (small group) with the masking objects 7Jm.

Figure 14:
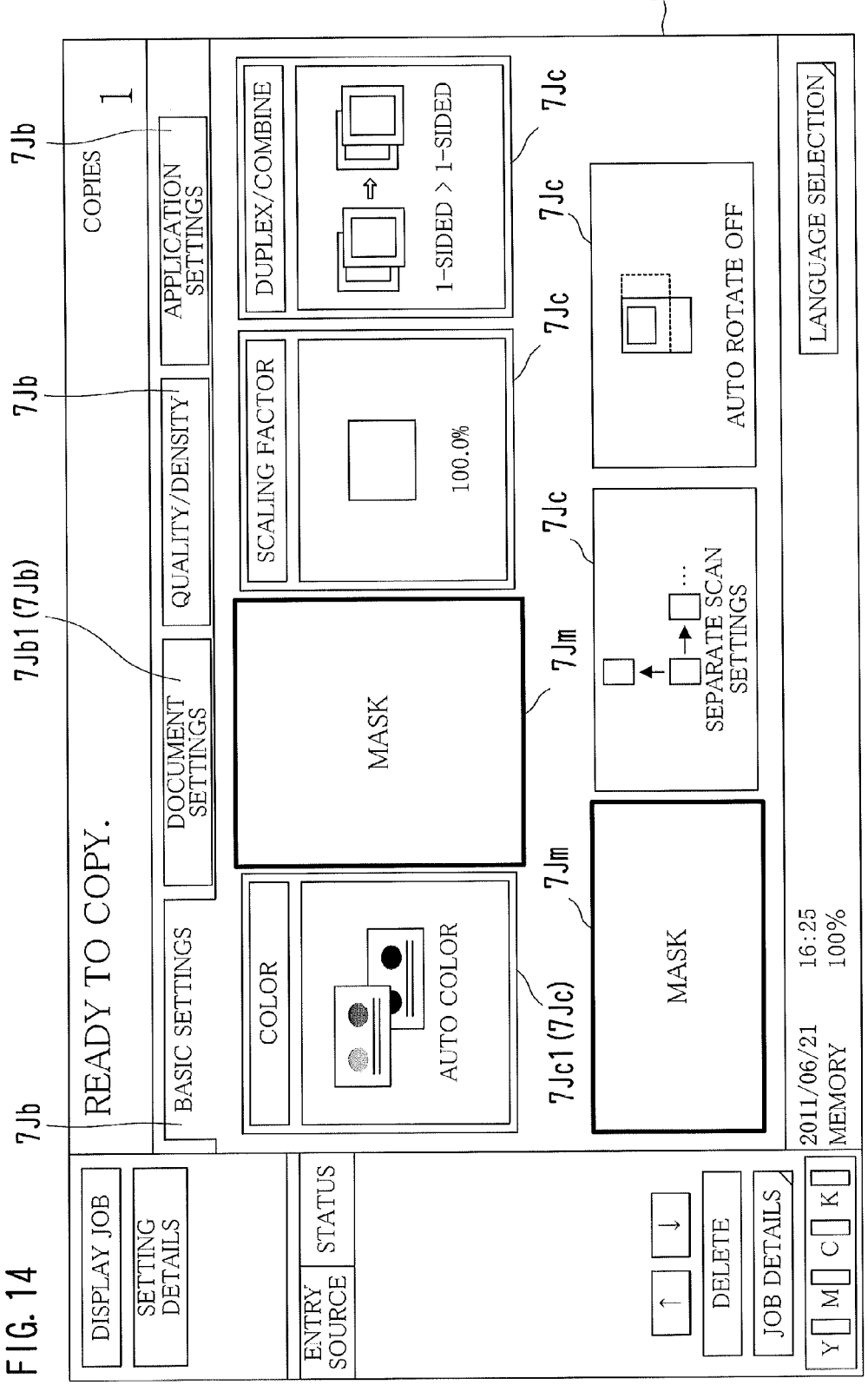
FIG. 14 is a diagram showing an example of the display form of a configuration screen for copy job configurations.

Alternatively, if only the type of an output destination medium is electronic paper, then the screen display control portion 121 covers, as shown in FIG. 14, an object 7Jc2 for selecting the paper group (small group) and an object 7Jc3 for selecting the finish group (small group) with the masking objects 7Jm.

Figure 15:
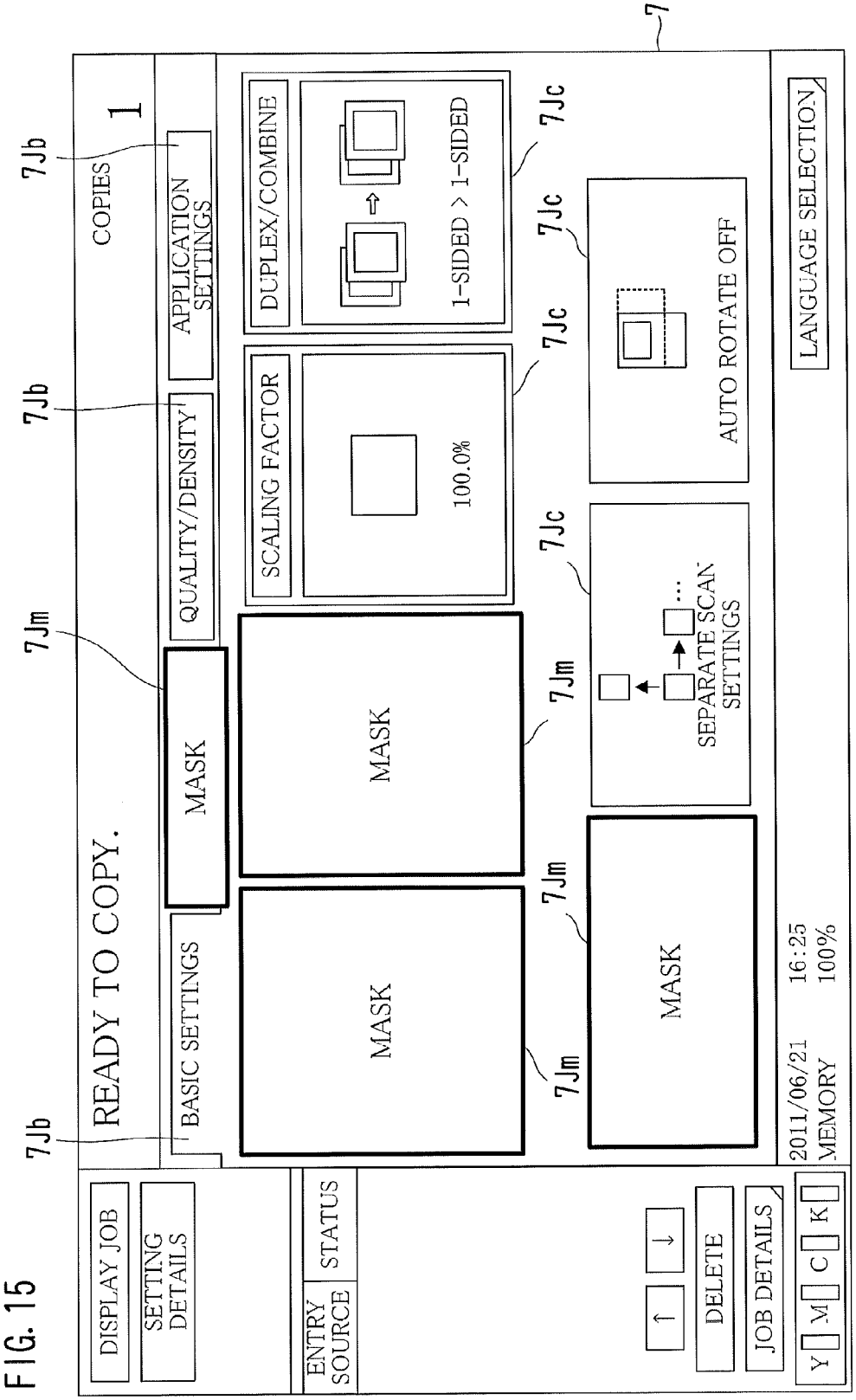
FIG. 15 is a diagram showing an example of the display form of a configuration screen for copy job configurations.

Yet alternatively, if both the type of an input source medium and the type of an output destination medium are electronic paper, then the screen display control portion 121 covers, as shown in FIG. 15, the objects 7Jb1, 7Jc1, 7Jc2, and 7Jc3 with the masking objects 7Jm. To put it differently, if both the input source medium and the output destination medium are electronic paper, then the screen display control portion 121 covers, with the masking objects 7Jm, the objects 7J hidden for the case where only one of the two media is electronic paper. The same applies to the descriptions hereinafter.

Figure 16:
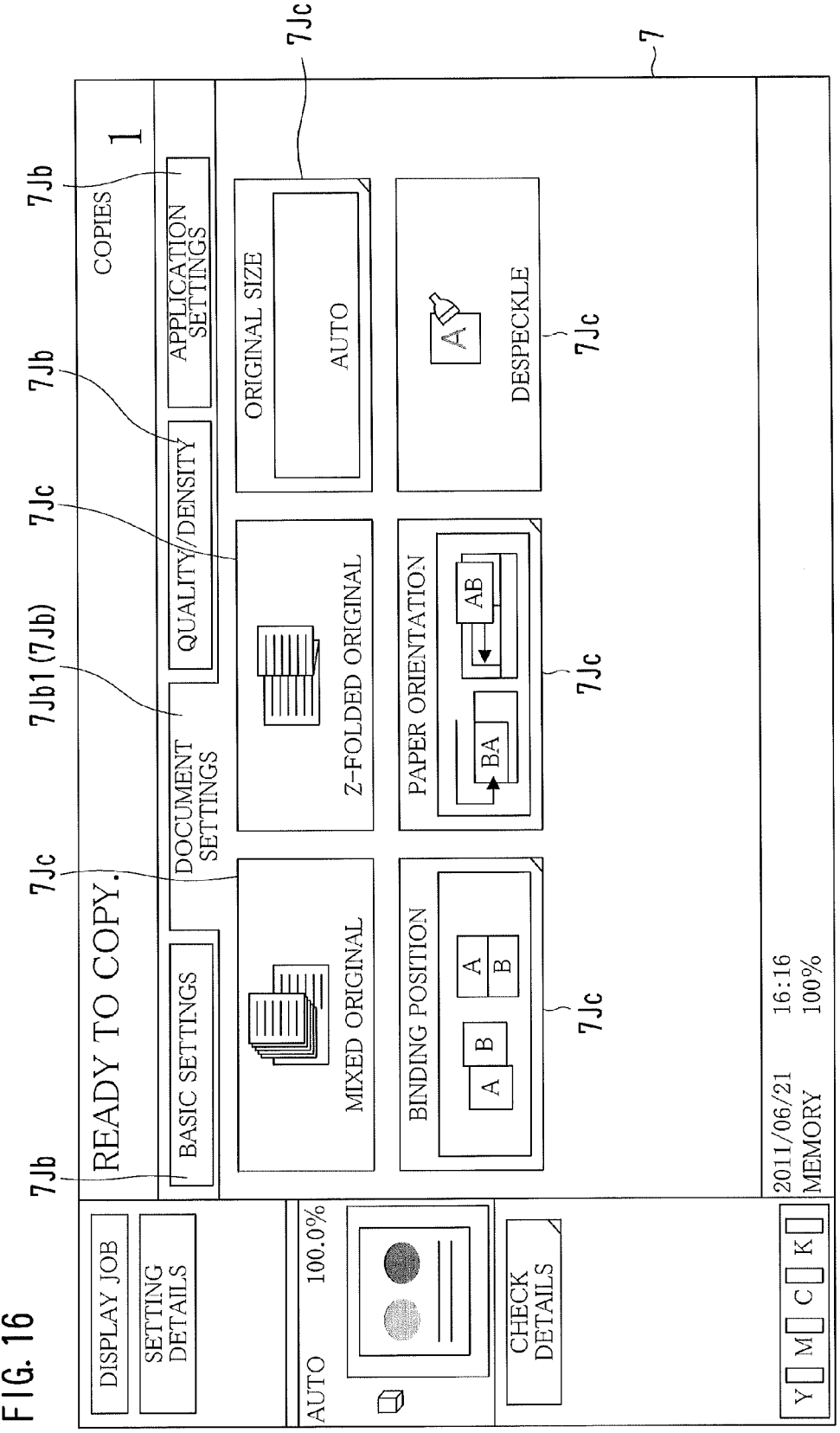
FIG. 16 is a diagram showing an example of the display form of a configuration screen for copy job configurations.

In the case where the group of document settings is selected, and at normal copying, the screen display control portion 121 updates the configuration screen 7 as shown in FIG. 16 by placing the objects 7Jc for selecting document-related conditions. Likewise, the screen display control portion 121 updates the configuration screen 7 as shown in FIG. 16 if only the type of an output destination medium is electronic paper.

Figure 17:
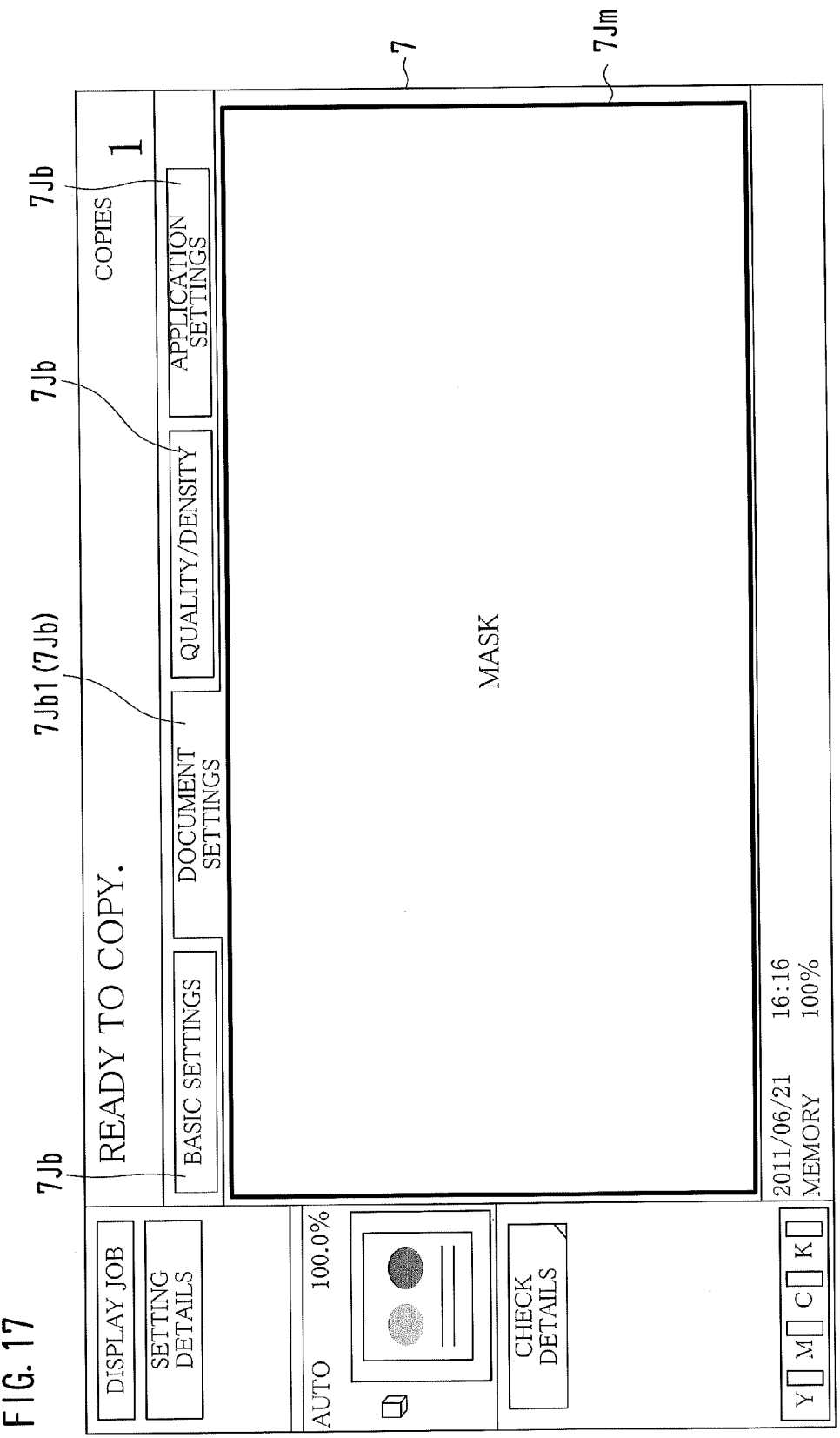
FIG. 17 is a diagram showing an example of the display form of a configuration screen for copy job configurations.

If the type of an input source medium is electronic paper, then the screen display control portion 121 covers, as shown in FIG. 17, all the objects 7Jc belonging to the document settings group with the masking object 7Jm.

Figure 18:
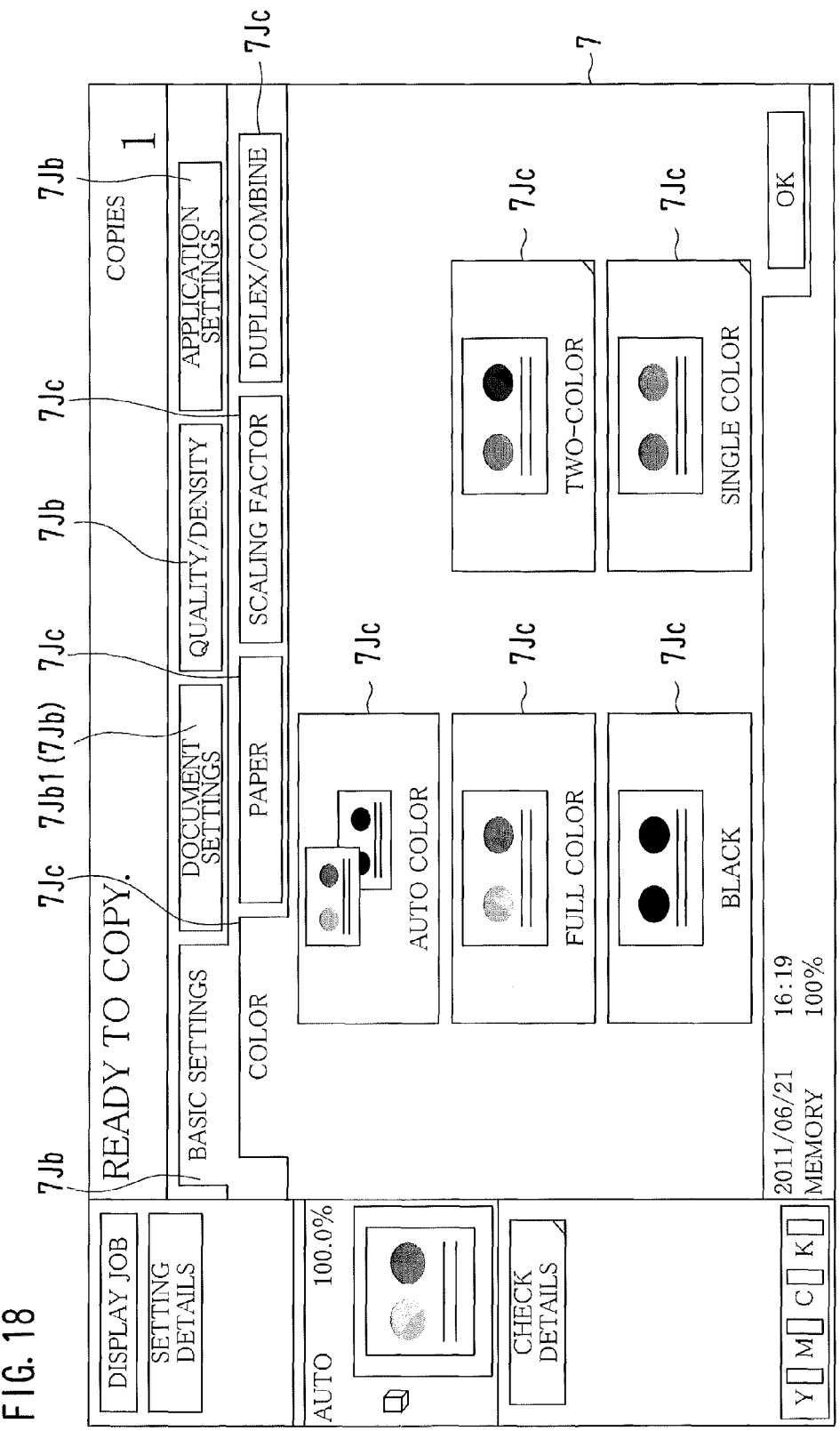
FIG. 18 is a diagram showing an example of the display form of a configuration screen for copy job configurations.

In the case where the group of color is selected, and, at normal copying, the screen display control portion 121 updates the configuration screen 7 as shown in FIG. 18 by placing the objects 7Jc for selecting color-related conditions of an output image. Likewise, the screen display control portion 121 updates the configuration screen 7 as shown in FIG. 18 if only the type of an output destination medium is electronic paper and if the specifications of the output destination electronic paper 3 satisfy the output destination specification requirements.

Figure 19:
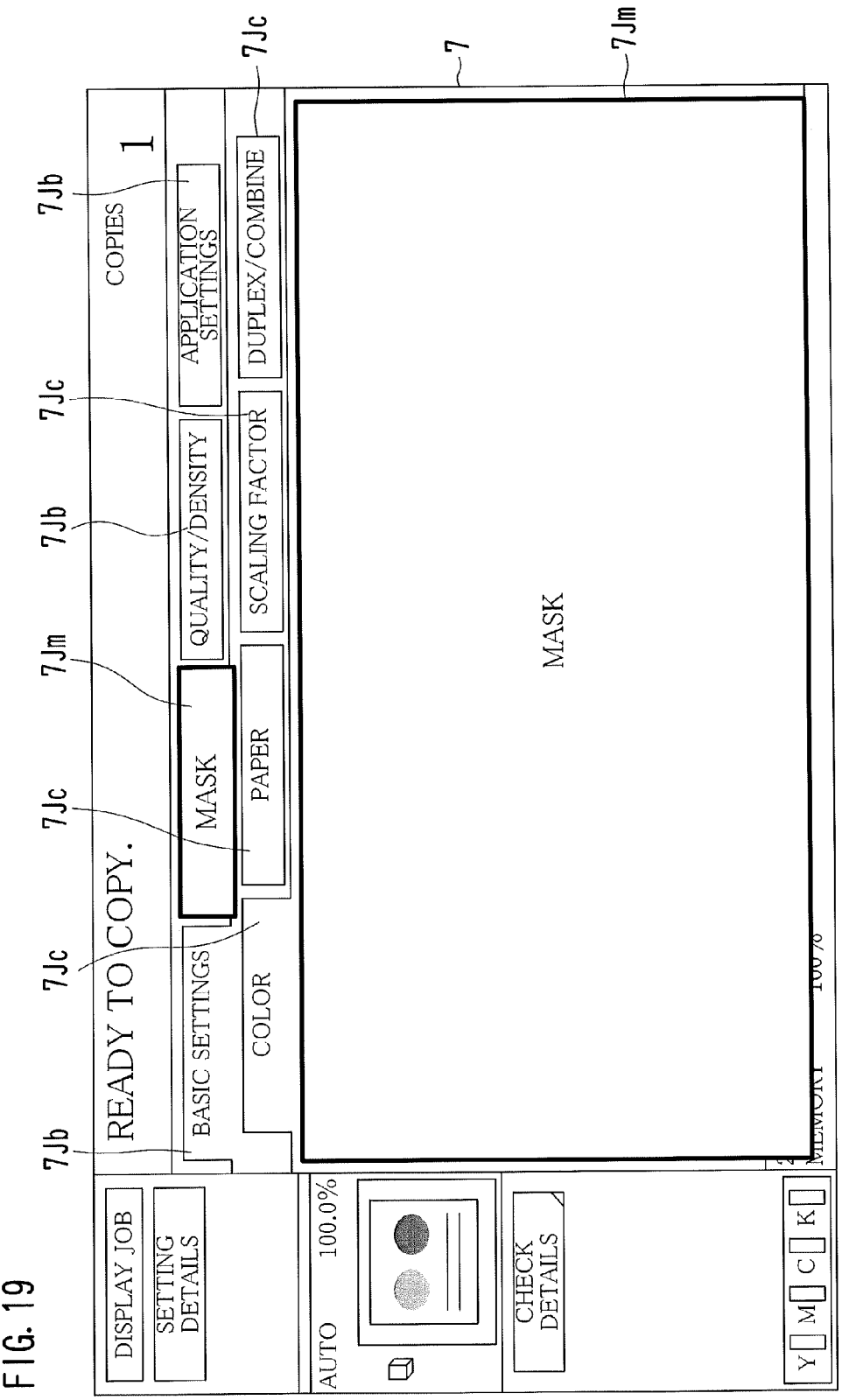
FIG. 19 is a diagram showing an example of the display form of a configuration screen for copy job configurations.

If the type of an input source medium is electronic paper, then the screen display control portion 121 covers, as shown in FIG. 19, all the objects 7Jc belonging to the color group with the masking object 7Jm.

Figure 20:
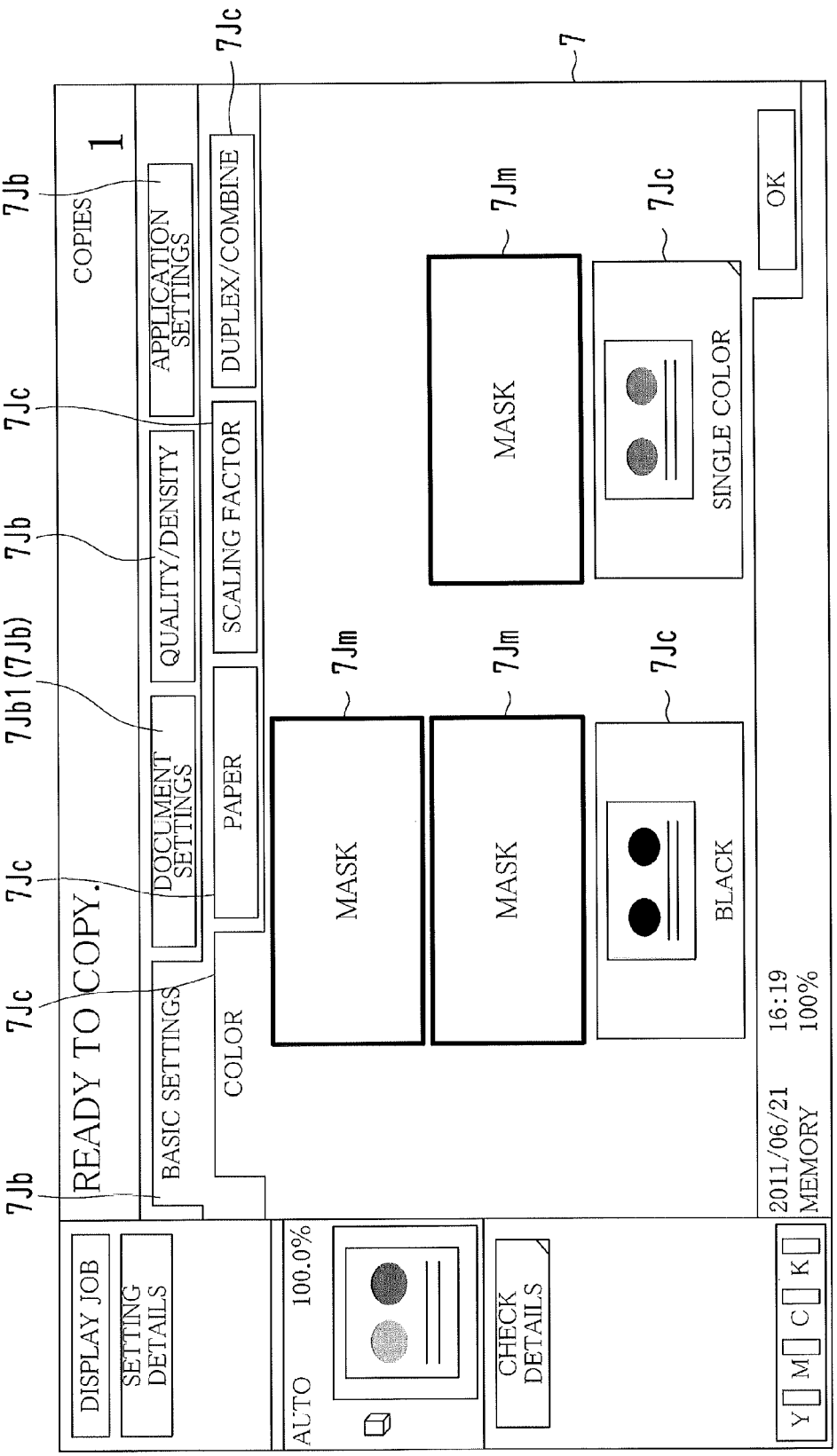
FIG. 20 is a diagram showing an example of the display form of a configuration screen for copy job configurations.

Alternatively, if only the type of an output destination medium is electronic paper, and, at the same time, if the specifications of the output destination electronic paper 3 do not satisfy the output destination specification requirements, then the screen display control portion 121 covers, as shown in FIG. 20, the objects 7Jc for the conditions not complying with the specifications of the electronic paper 3 with the masking objects 7Jm.

Figure 21:
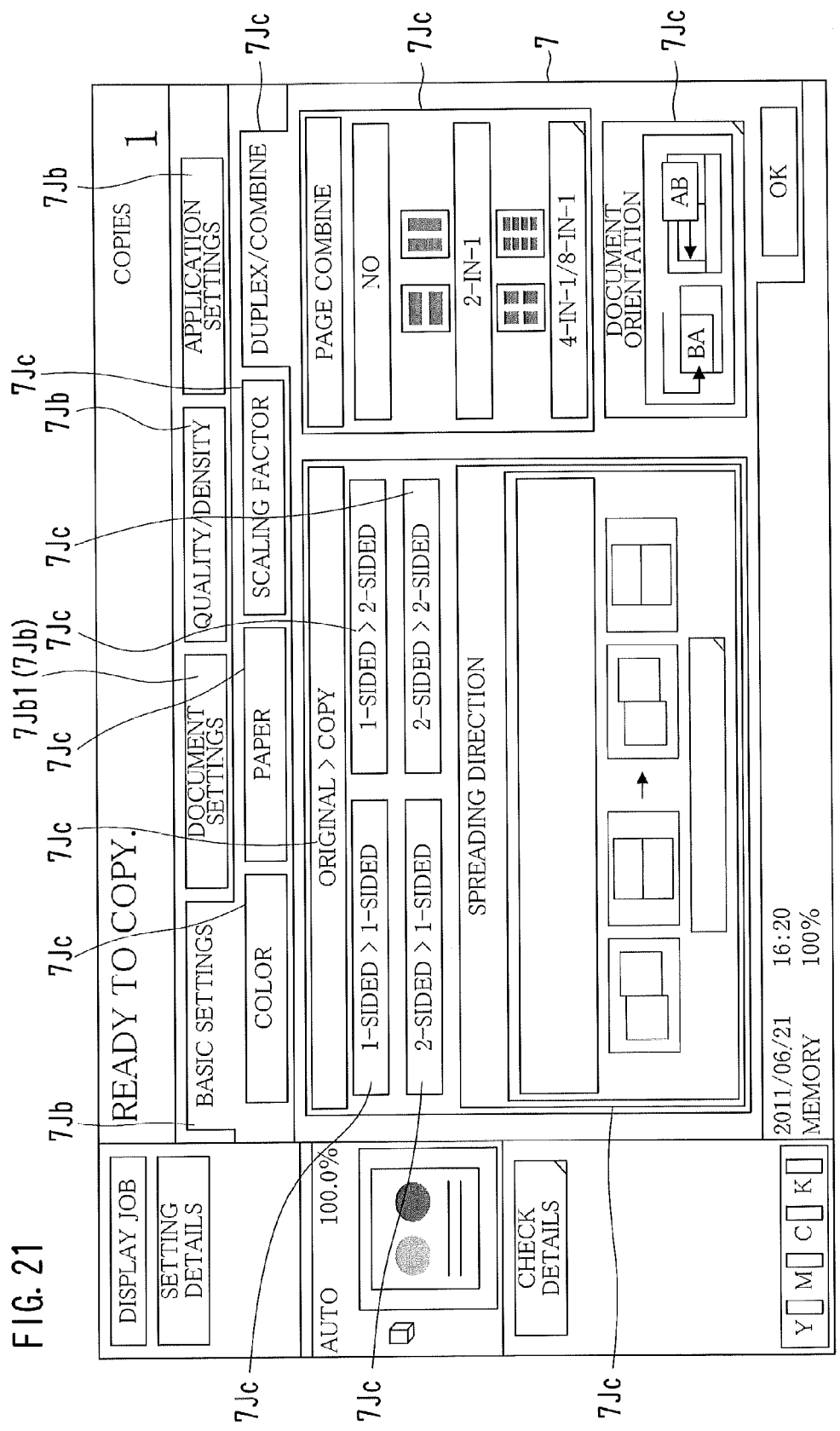
FIG. 21 is a diagram showing an example of the display form of a configuration screen for copy job configurations.

In the case where the group of duplex/combine (small group) is selected, and at normal copying, the screen display control portion 121 updates the configuration screen 7 as shown in FIG. 21 by placing the objects 7Jc for selecting conditions related to an image-carrying surface of document (surface to be scanned) of an input source medium, conditions related to a print side of an output destination medium, and conditions related to combined printing ("N-in-1 printing" or "N-up printing").

Figure 22:
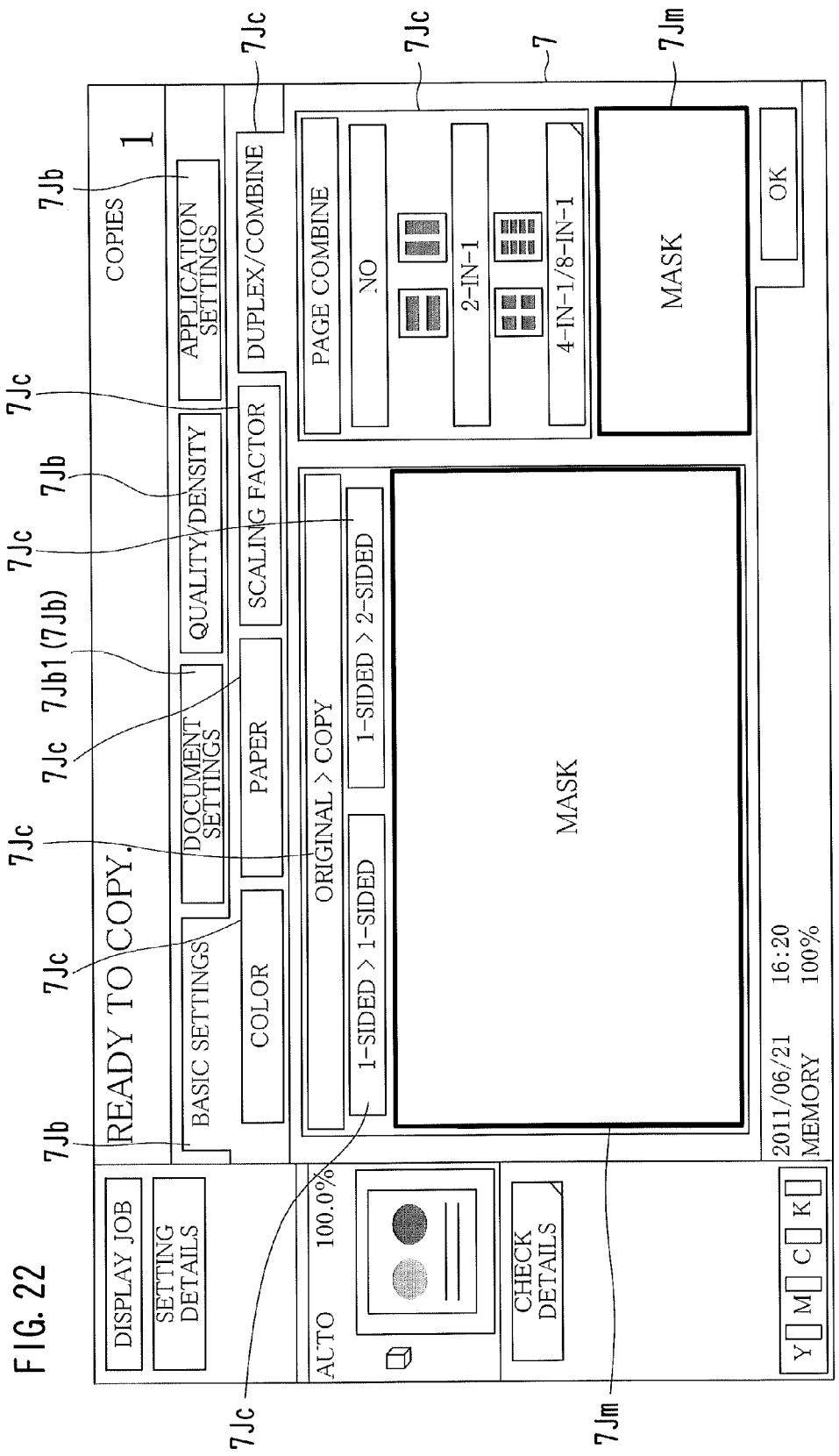
FIG. 22 is a diagram showing an example of the display form of a configuration screen for copy job configurations.

If only the type of an input source medium is electronic paper, then the screen display control portion 121 covers with the masking objects 7Jm, as shown in FIG. 22, an object 7Jc for a condition that both sides of a document are to be scanned, an object 7Jc for a condition related to the spreading direction of the document, and an object 7Jc for a condition related to document orientation. To put it differently, the screen display control portion 121 covers such objects 7Jc for conditions unrelated to electronic paper.

Figure 23:
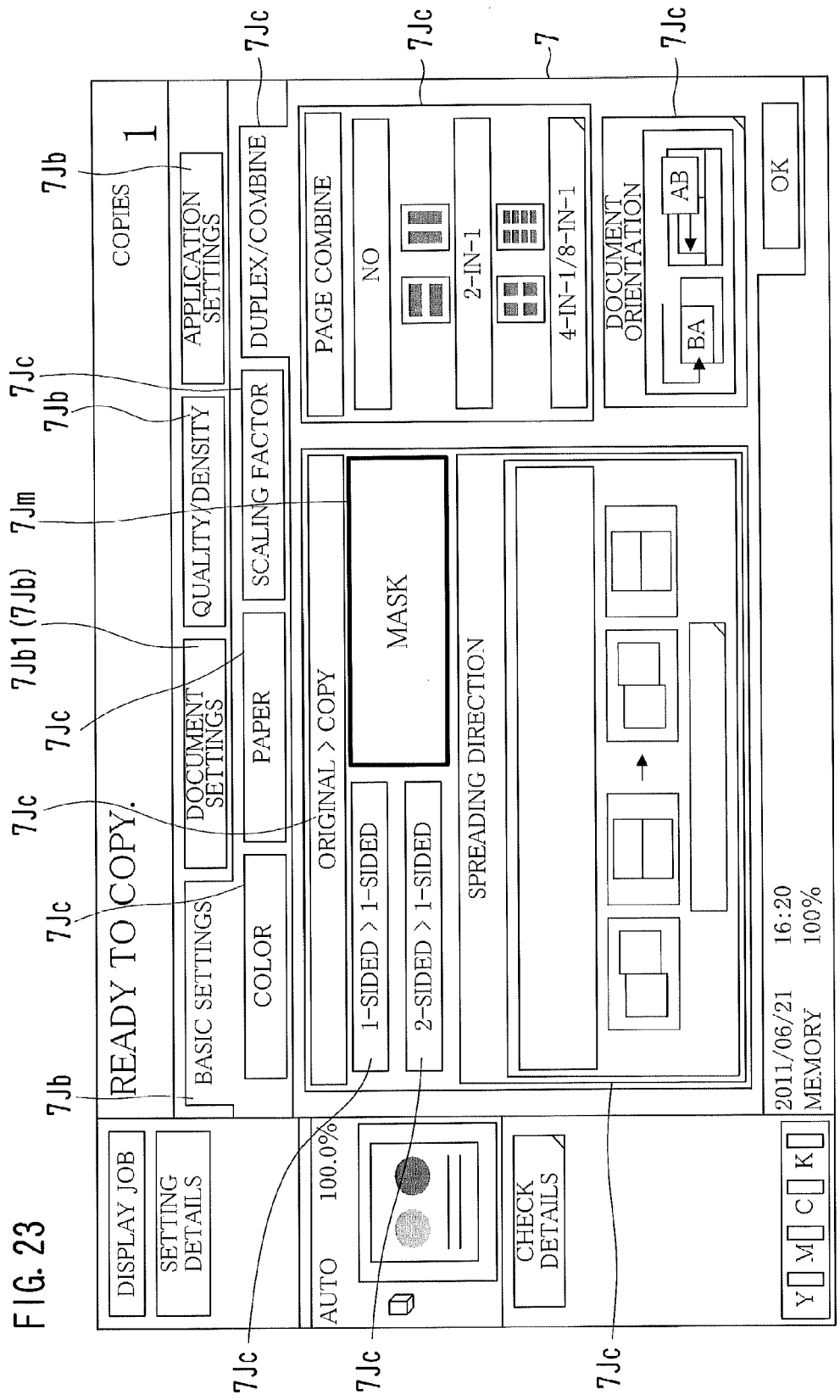
FIG. 23 is a diagram showing an example of the display form of a configuration screen for copy job configurations.

Alternatively, if only the type of an output destination medium is electronic paper, then the screen display control portion 121 covers with the masking object 7Jm, as shown in FIG. 23, an object 7Jc for a condition that images are to be printed onto both sides of paper. To put it differently, the screen display control portion 121 covers such an object 7Jc for conditions unrelated to electronic paper.

Figure 24:
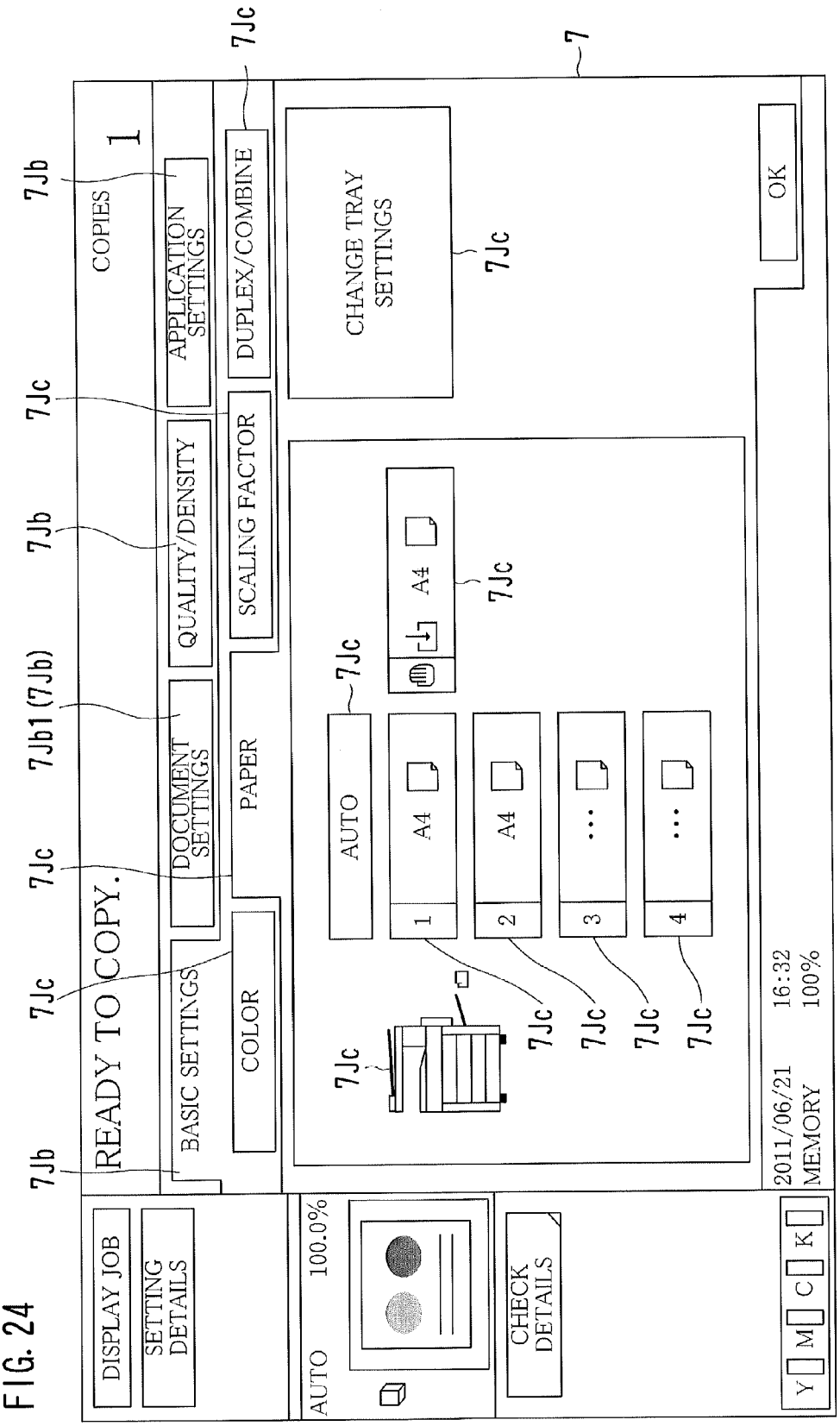
FIG. 24 is a diagram showing an example of the display form of a configuration screen for copy job configurations.

In the case where the group of paper is selected, and at normal copying, the screen display control portion 121 updates the configuration screen 7 as shown in FIG. 24 by placing the objects 7Jc related to conditions such as the size of ordinary sheet to be used as the output destination medium. Further, if only the type of an input source medium is electronic paper, the screen display control portion 121 updates the configuration screen 7 in a like manner.

Figure 25:
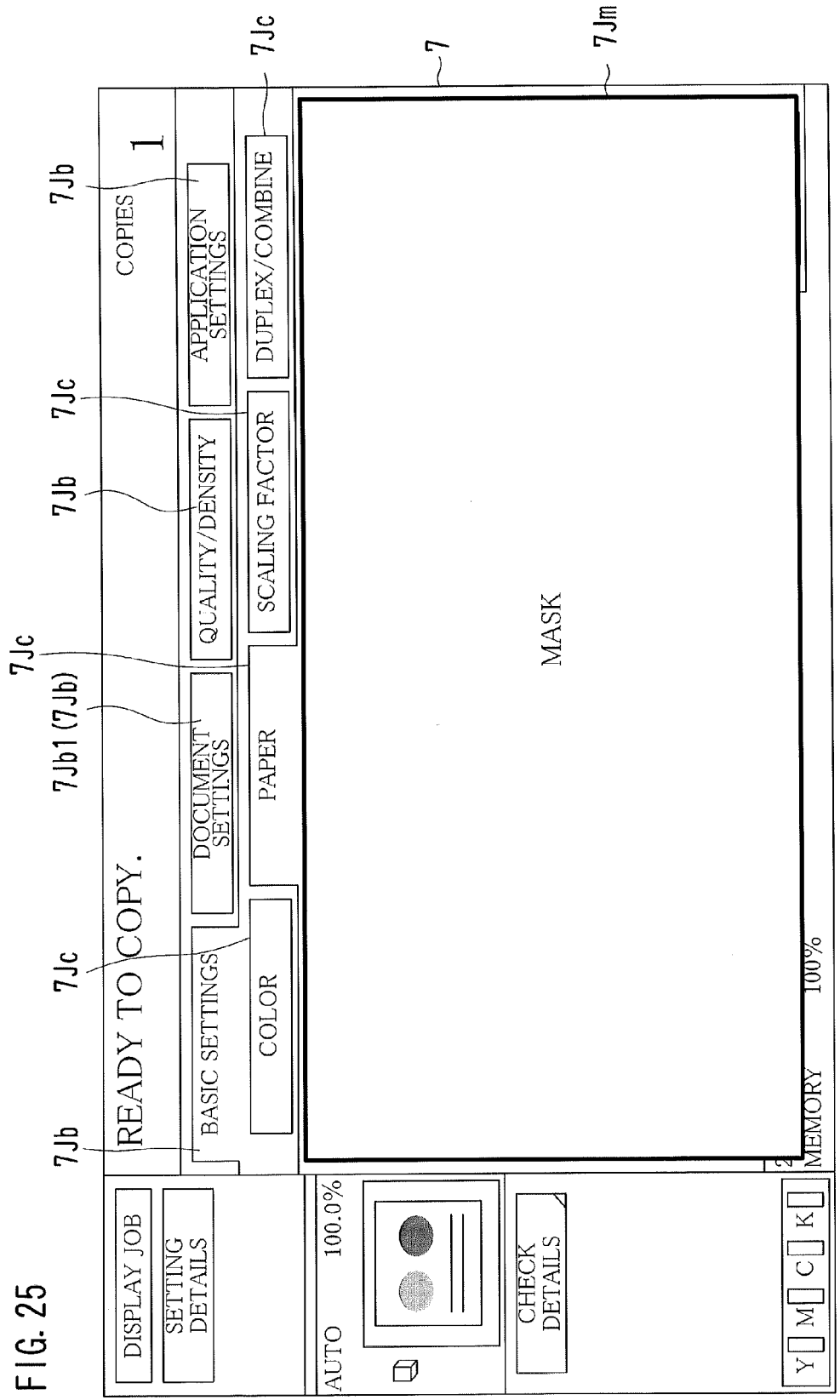
FIG. 25 is a diagram showing an example of the display form of a configuration screen for copy job configurations.

If the type of an output destination medium is electronic paper, then the screen display control portion 121 covers, as shown in FIG. 25, all the objects 7Jc belonging to the paper group with the masking object 7Jm.

If any one of the paper input trays 182 (see FIG. 6) is selected, and further, in order to change the configuration for the selected paper input tray 182, if the group "change in configurations for selected tray" (small group) is selected, and at normal copying, the screen display control portion 121 updates the configuration screen 7, as shown in FIG. 26, by placing the objects 7Jc for selecting conditions for the selected paper input tray 182. Further, the screen display control portion 121 updates the configuration screen 7 in a like manner if only the type of an input source medium is electronic paper.

Figure 27:
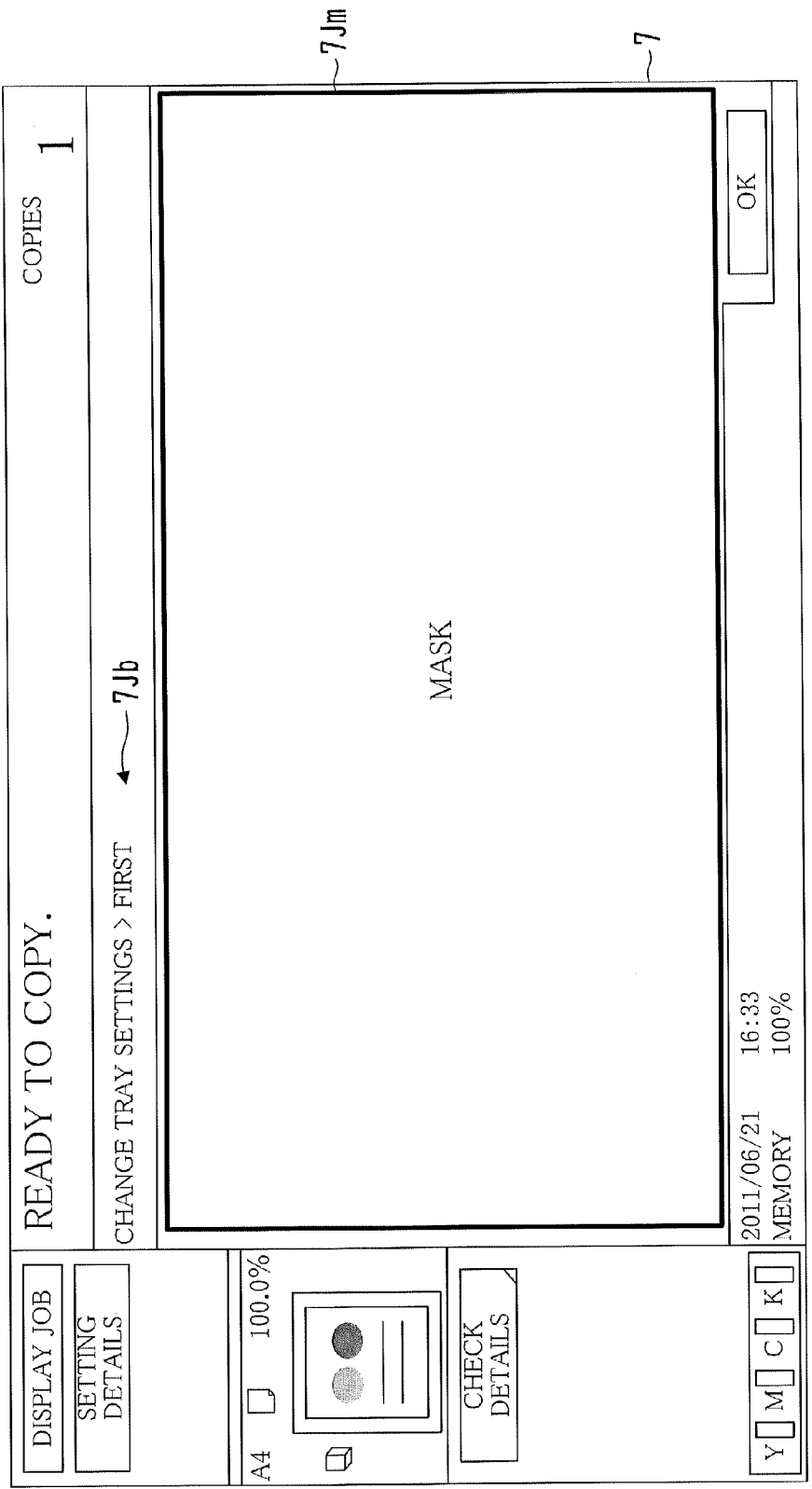
FIG. 27 is a diagram showing an example of the display form of a configuration screen for copy job configurations.

If the type of an output destination medium is electronic paper, then the screen display control portion 121 covers, as shown in FIG. 27, all the objects 7Jc belonging to the group with the masking object 7Jm.

Figure 28:
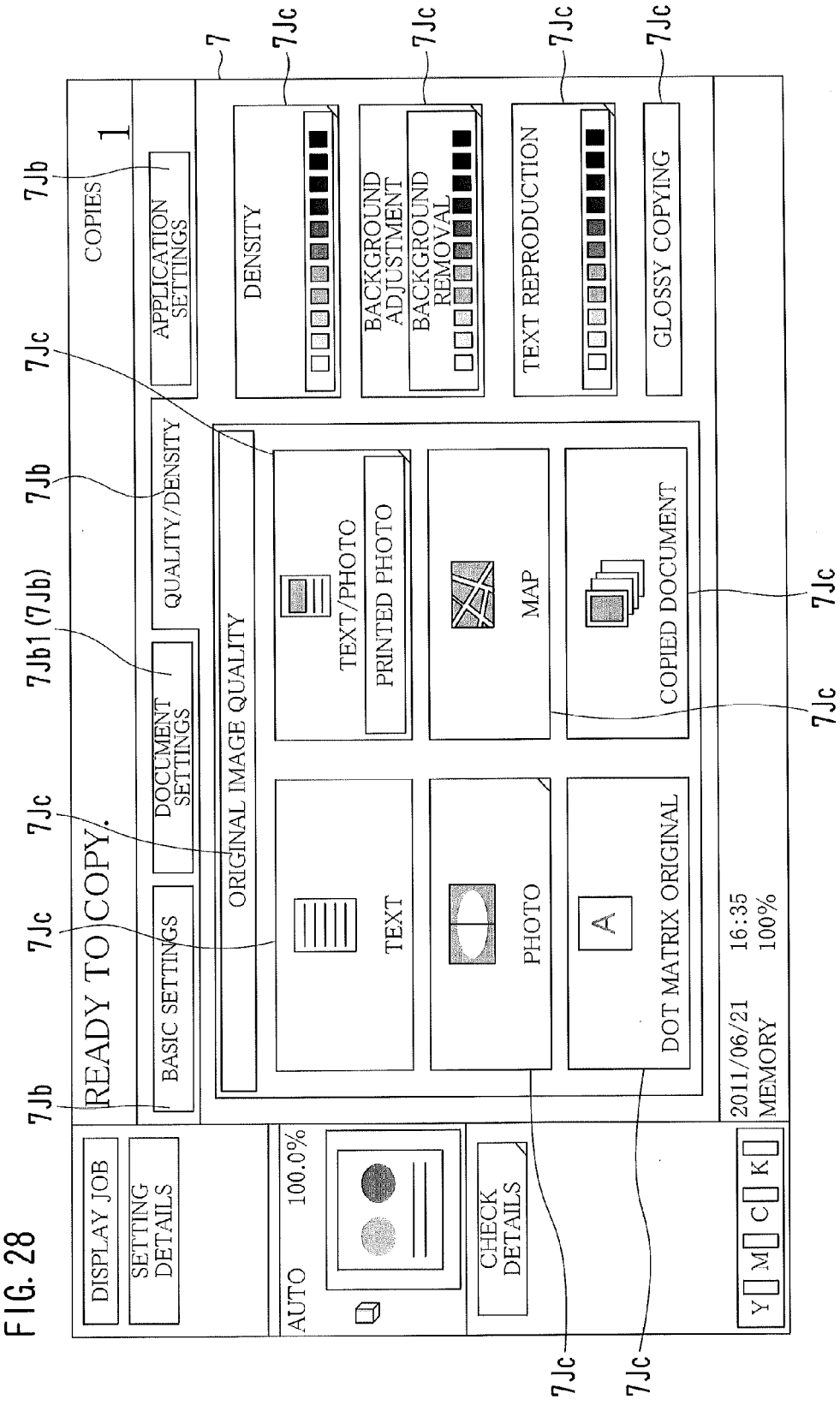
FIG. 28 is a diagram showing an example of the display form of a configuration screen for copy job configurations.

In the case where the group of quality/density is selected, and at normal copying, the screen display control portion 121 updates the configuration screen 7 as shown in FIG. 28 by placing the objects 7Jc for selecting conditions for the case of reading out a document image. Even if the type of an input source medium is electronic paper, or, even if the type of an output destination medium is electronic paper, the screen display control portion 121 updates the configuration screen 7 in a like manner.

Figure 29:
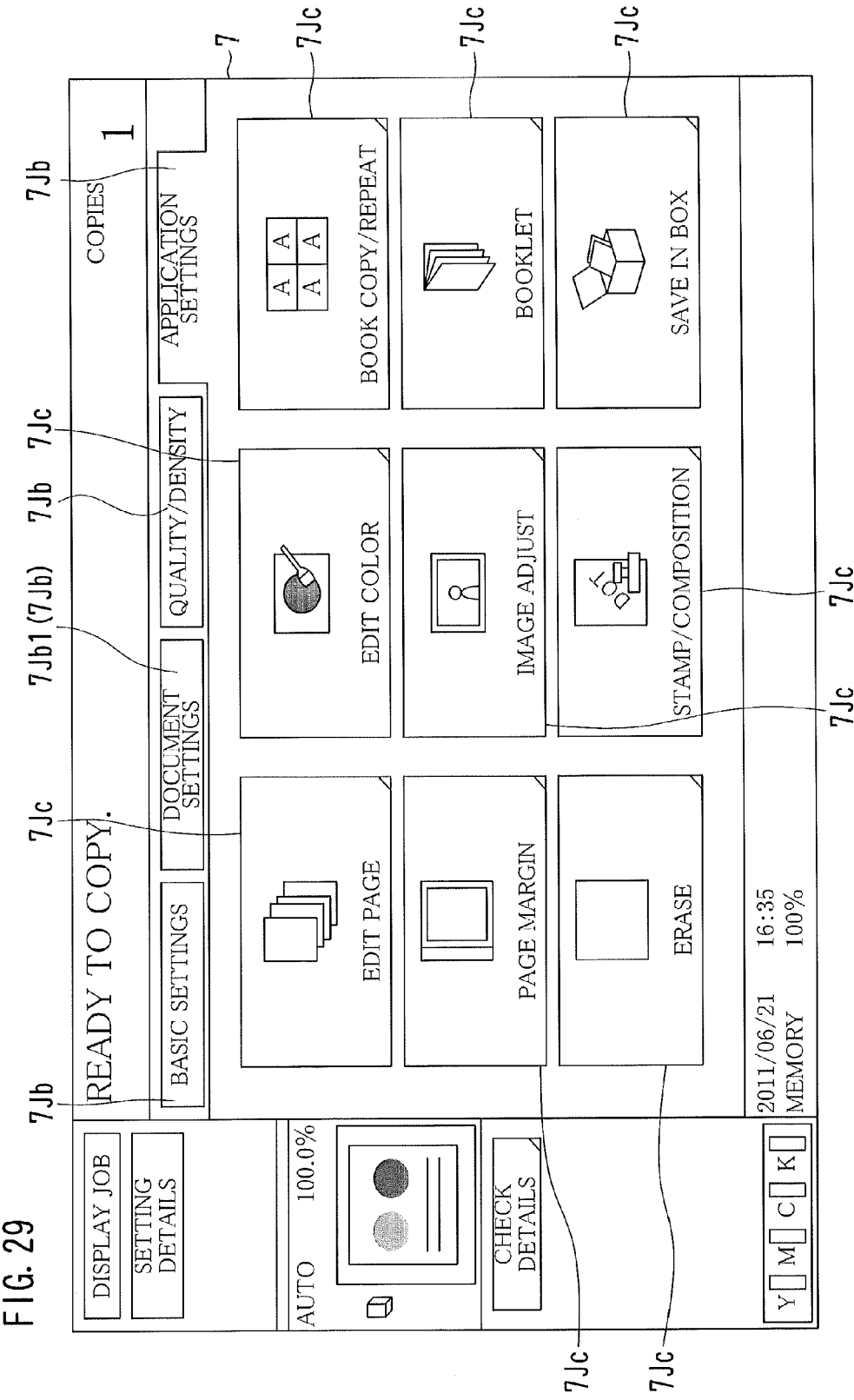
FIG. 29 is a diagram showing an example of the display form of a configuration screen for copy job configurations.

In the case where the group of application settings is selected, and at normal copying, the screen display control portion 121 updates the configuration screen 7 as shown in FIG. 29 by placing the objects 7Jc for making settings on application conditions. Even if the type of an input source medium is electronic paper, or, even if the type of an output destination medium is electronic paper, the screen display control portion 121 updates the configuration screen 7 in a like manner.

As discussed above, if the type of an input source medium is electronic paper, then the screen display control portion 121 hides objects irrelevant to the electronic paper among objects for document-related conditions. To be specific, if the type of an input source medium is electronic paper, the screen display control portion 121 hides an object for selecting the size of document paper (ordinary sheet), an object for selecting color printing or monochrome printing of an image read out from document paper, an object for designating, as a surface to be scanned, both faces of document paper, an object for selecting a process to be performed on document paper (Z-folding, mixed sizes, and binding position), an object for designating document paper orientation, and other objects. On the other hand, the screen display control portion 121 places objects related to electronic paper without hiding the same. To be specific, the screen display control portion 121 places an object for designating one face as a surface to be scanned, an object for selecting (adjusting) the density of a document image, an object for selecting the type of a document (character document, photograph document, dot matrix document, and so on) without hiding the objects.

Likewise, if the type of an output destination medium is electronic paper, then the screen display control portion 121 hides objects irrelevant to the electronic paper among objects for document-related conditions. To be specific, the screen display control portion 121 hides an object for selecting the size of paper (ordinary sheet) as an output destination medium, an object for designating, as a print side, both faces of document paper, an object for selecting the type of paper, an object for selecting a finish to be applied to a printed matter, and other objects. On the other hand, the screen display control portion 121 places objects related to electronic paper without hiding the same. To be specific, the screen display control portion 121 places an object for designating one face as a print side, an object for selecting color printing or monochrome printing of an output image, and an object for selecting a scaling factor without hiding the objects.

The user can set various conditions by performing operation on the touch-sensitive panel display 10e2 displaying the configuration screen 7.

The processing conditions setting portion 123 generates job setting data 6C indicating conditions set by the user, and stores the job setting data 6C into the setting data storage portion 132. The setting data storage portion 132 stores, in advance, power-saving setting data 6E described below.

[Power-Saving Processing]

FIG. 30 is a diagram showing an example of the power-saving setting data 6E.

The energy saving process portion 122 performs power-saving processing based on the power-saving setting data 6E depending on the type of a medium from which an image is read out and the type of a medium onto which an image is written.

Referring to FIG. 30, the power-saving setting data 6E shows power-saving methods depending on an image input source medium and an image output destination medium.

To be specific, there are prepared records for each combination of an image input source medium and an image output destination medium. Each of the records shows, in the field of "MFP energy-saving mode", a power-saving method used for a job to be executed based on the combination.

The MFP energy-saving mode comes in two types of "fixing OFF" and "scanner OFF". The type of "fixing OFF" means stopping supplying power to a unit for fixing toner onto an ordinary sheet, i.e., the printer unit 10j mainly. The type of "scanner OFF" means stopping supplying power to the scanner unit 10g.

The energy saving process portion 122 sends power supply control data 67 to the power supplying portion 10p in accordance with an MFP energy-saving mode shown in a record for the combination of an image input source medium and an image output destination medium. To be specific, if the "fixing OFF" is shown in the MFP energy-saving mode field, then the energy saving process portion 122 sends, as the power supply control data 67, data indicating that power supply to the printer unit 10j is stopped. If the "scanner OFF" is shown in the MFP energy-saving mode field, then the energy saving process portion 122 sends, as the power supply control data 67, data indicating that power supply to the scanner unit 10g is stopped. If both the "fixing OFF" and the "scanner OFF" are shown in the MFP energy-saving mode field, the energy saving process portion 122 sends, as the power supply control data 67, data indicating that power supply to the scanner unit log and the printer unit 10j is stopped.

Upon the receipt of the power supply control data 67, the power supplying portion 10p stops supplying power to the scanner unit 10g and/or the printer unit 10j in accordance with the power supply control data 67.

[Job Execution]

Referring to FIG. 30, the power-saving setting data 6E also shows, for each combination of an image input source medium and an image output destination medium, image processing to be performed in the field of "MFP image processing".

Examples of the MFP image processing are "input image processing", "output image processing", and "resolution conversion processing". The "input image processing" is predetermined image processing to be performed on an image inputted from an input source medium. The "output image processing" is predetermined image processing to be performed on an image to be outputted to an output destination medium. The "resolution conversion processing" is processing for converting the resolution of an image to be outputted to an output destination medium. This is a part of the output image processing.

The job execution control portion 124 controls devices such as the large-capacity storage 10d, the network interface 10f, the scanner unit 10g, the input image processing portion 10h, the output image processing portion 10i, the printer unit 10j, and the fax board 10k in such a manner that a copy job is executed based on the job setting data 6C stored in the setting data storage portion 132.

To be specific, the job execution control portion 124 controls the individual devices such that image data of an image is obtained from an input source medium. If some kind of MFP image processing is indicated in a record for a combination of an input source medium and an output destination medium of the power-saving setting data 6E, then the job execution control portion 124 controls the individual devices such that the MFP image processing is performed. The job execution control portion 124 then controls the individual devices such that an image that has been subjected to the MFP image processing as needed is outputted.

Figure 31:
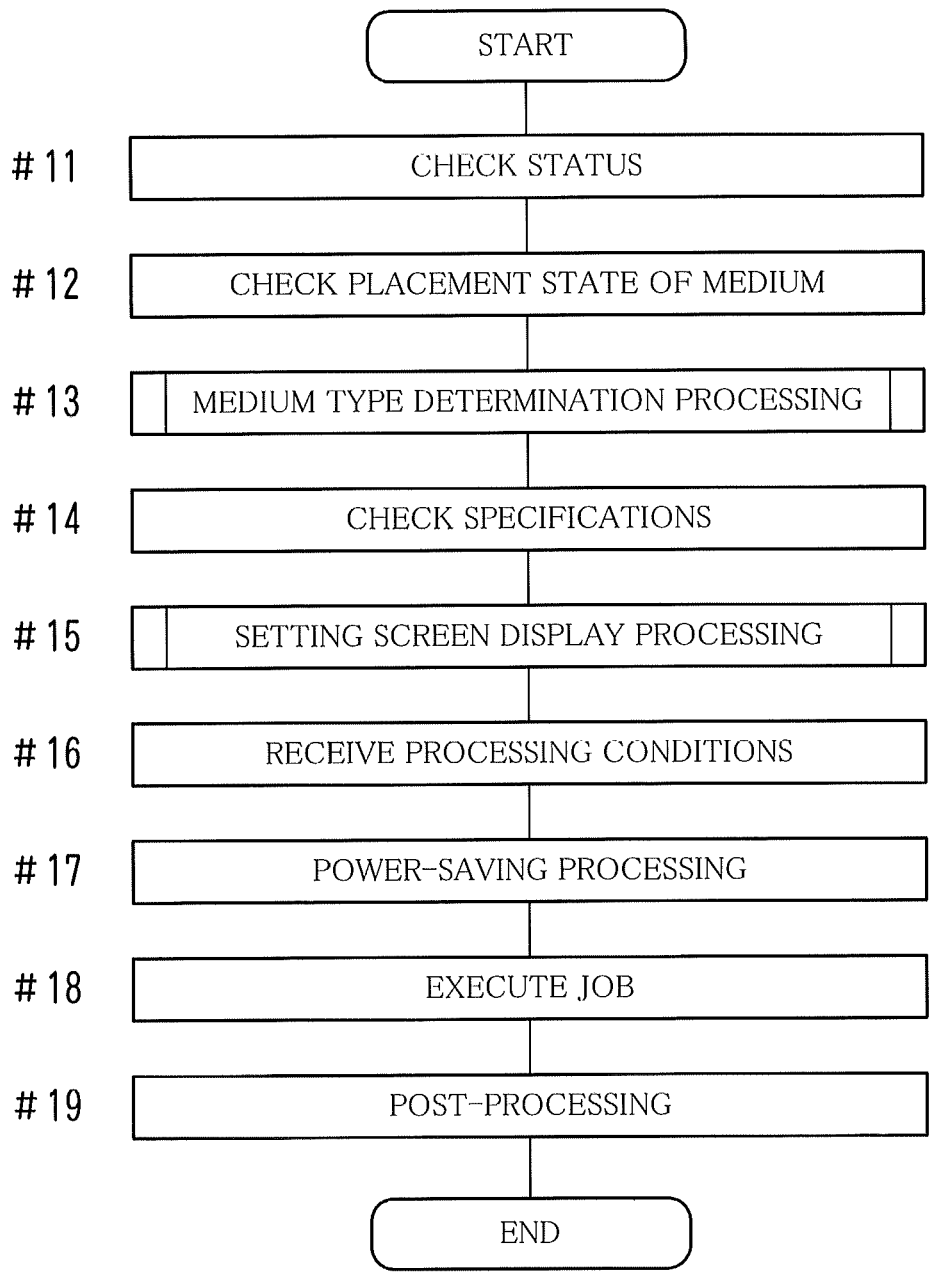
FIG. 31 is a flowchart depicting an example of the flow of the overall processing performed by an image forming apparatus.

FIG. 31 is a flowchart depicting an example of the flow of the overall processing performed by the image forming apparatus 1.

The entire flow of job execution processing performed by the image forming apparatus 1 is described with reference to the flowchart of FIG. 31 by taking an example of copying a document on which images such as characters, illustration, and charts are depicted.

A user places an ordinary sheet on which a document is depicted in a predetermined position of the scanner unit 10g. Alternatively, the user places electronic paper 3 displaying a document in a specific position of a document end (document input end). Hereinafter, an example in which electronic paper 3A is used as the electronic paper 3 is described. When the electronic paper 3A is not in use, the user turns the electronic paper 3A OFF. Alternatively, when the electronic paper 3A is not in use, the user turns the communication function thereof OFF. The same applies to electronic paper 3B described later.

The user, then, places an ordinary sheet onto which a document is to be printed in the paper input trays 182 or the manual feeder 183. Alternatively, the user places electronic paper 3 to which the document is to be sent in a specific position of a document output end with no image displayed in the electronic paper 3. Hereinafter, an example in which electronic paper 3B is used as the electronic paper 3 is described.

The user enters a command for switching to a copy job mode into the image forming apparatus 1.

In response to the command entered, the image forming apparatus 1 attempts to check a display-related status by sending status inquiry data 61 to the electronic paper 3A and the electronic paper 3B (Step #11 of FIG. 31).

When receiving the status inquiry data 61, each piece of the electronic paper 3A and 3B sends, to the image forming apparatus 1, status data 62 indicating a display-related status and the identifier of the subject electronic paper.

In parallel with the processing of Step #11 or before or after, the image forming apparatus 1 checks, through the paper detection sensor 10m, whether or not an object such as an ordinary sheet or electronic paper 3 is placed in any of the specific places (Step #12). In this way, the detection result data 64 is obtained.

When receiving the status data 62 and the detection result data 64, the image forming apparatus 1 analyzes the type of an input source medium and the type of an output destination medium based on the data received (Step #13). How to analyze the type is discussed earlier with reference to FIG. 9. If no status data 62 is obtained, both the types of the input source medium and the output destination medium are probably ordinary sheets. In such a case, the determination that both the types are ordinary sheets is possible without performing the processing shown in FIG. 9.

If the type of at least one of the input source medium and the output destination medium is electronic paper, then the image forming apparatus 1 checks the specifications of the electronic paper 3A or the electronic paper 3B by sending the specification inquiry data 65 thereto (Step #14). To be specific, if the type of the input source medium is determined to be electronic paper, then the image forming apparatus 1 sends the specification inquiry data 65 to the electronic paper 3A. If the type of the output destination medium is determined to be electronic paper, then the image forming apparatus 1 sends the specification inquiry data 65 to the electronic paper 3B.

When receiving the specification inquiry data 65, each piece of the electronic paper 3A and 3B sends, to the image forming apparatus 1, the specification data 66 indicating the specifications and the identifier of the subject electronic paper 3A or 3B.

The image forming apparatus 1 displays the configuration screen 7 after appropriately editing the same based on the data obtained in the foregoing steps (Step #15). The method for display processing is provided earlier with reference to FIGS. 10 and 11.

When the configuration screen 7 is displayed, the user operates the key entry portion 10e1 or the touch-sensitive panel display 10e2 to enter conditions for a copy job, and so on. The image forming apparatus 1 updates the entire or a part of the configuration screen 7 in accordance with the user operation. At this time, some objects 7J are hidden depending on the type of the input source medium and the type of the output destination medium or the specifications thereof.

When receiving the conditions for a copy job (Step #16), the image forming apparatus 1 performs power-saving processing depending on the type of the input source medium and the type of the output destination medium (Step #17), and executes the copy job based on the received conditions. After that, the image forming apparatus 1 performs post-processing (Step #18) and waits for the next job to be instructed. If another copy job is instructed, the image forming apparatus 1 performs the foregoing processing from the beginning.

According to this embodiment, it is possible to reduce the burden on a developer who designs a screen used for cooperating processing between an image forming apparatus and electronic paper. It is also possible to provide a screen which eliminates the need for a user to learn how to perform operation thereon.

In this embodiment, electronic paper 3 is used as an output destination medium on the condition that no image is displayed on the electronic paper 3. Instead of this, however, it is possible to display a specific image, e.g., an image representing a blank sheet on the electronic paper 3.

In this embodiment, an example is described in which an image is inputted from the electronic paper 3 or an image is outputted to the electronic paper 3. Instead of the electronic paper 3, a tablet PC, a smartphone, a laptop PC, or the like may be used.

In this embodiment, the image forming apparatus 1 detects the type of an input source medium and the type of an output destination medium. Another configuration is possible in which a user designates the types thereof in the image forming apparatus 1.

In this embodiment, objects 7J for designating conditions irrelevant to electronic paper are hidden. Another configuration is possible in which, even in conditions related to electronic paper, when options of such conditions are naturally narrowed down to one option, an object 7J for selecting the option may be hidden. For example, an object 7J for selecting one face as a surface to be scanned and an object 7J for selecting one face as a print side may be hidden.

In this embodiment, an object 7J is hidden by overlaying the masking object 7Jm on the object 7J. This way is effective also for the case where the entirety of the configuration screen 7 is displayed by using one set of image data. However, when image data is managed on an object-by-object basis like this embodiment, it is also possible to disable the showing of the object 7J by not placing the object 7J from the beginning.

If the image forming apparatus 1 is provided with cabinet having a plurality of bins, a specific one of the bins may be used as a specific place where input source electronic paper 3 is put. Likewise, a specific one of the bins may be used as a specific place where output destination electronic paper 3 is put.

During the display of the configuration screen 7, if electronic paper 3 used as an input source medium cannot be detected because it is put away from a specific place of an input end (document input end), the image forming apparatus 1 may display again the configuration screen 7 based on the configuration used for the case where an ordinary sheet is used as the input source medium. Likewise, during the display of the configuration screen 7, if electronic paper 3 used as an output destination medium cannot be detected because it is put away from a specific place of a document output end, the image forming apparatus 1 may display again the configuration screen 7 based on the configuration used for the case where an ordinary sheet is used as the output destination medium.

During the display of the configuration screen 7, if electronic paper 3 used as an input source medium cannot be detected because it is put away from a specific place of a document input end, the power supplying portion 10p may cancel the power-saving operation on the scanner unit 10g, and may resume usual power supply operation on the scanner unit 10g. Likewise, during the display of the configuration screen 7, if electronic paper 3 used as an output destination medium cannot be detected because it is put away from a specific place of a document output end, the power supplying portion 10p may cancel the power-saving operation on the printer unit 10j, and may resume usual power supply operation on the printer unit 10j.

When the electronic paper 3 cannot be detected in a specific place of a document input end, the value of the document input end flag 6F1 is updated with the value of "0". Likewise, when the electronic paper 3 cannot be detected in a specific place of a document output end, the value of the document output end flag 6F2 is updated with the value of "0".

In order to ensure the detection that the electronic paper 3 is used as an input source medium or an output destination medium, the wireless base station 53 (see FIG. 1) may be installed next to the image forming apparatus 1, and a communication area of the wireless base station 53 may be limited to a range from several tens of centimeters to several meters. In the case where a plurality of wireless base stations 53 are installed, the following arrangement may be adopted. To be specific, one of the wireless base stations 53 is installed next to the image forming apparatus 1, and a communication area of the wireless base station 53 may be limited to a range from several tens of centimeters to several meters. Then, only the electronic paper 3 with which the image forming apparatus 1 performs communication through that wireless base station 53 is preferably detected as an input source medium or an output destination medium.

In this embodiment, the image forming apparatus 1 and the electronic paper 3 perform communication with each other through a so-called Local Area Network (LAN). Instead of this, however, it is possible to use a communication device complying with standards for near field communication such as Bluetooth (registered trademark) or wireless Universal Serial Bus (USB) for communication between the image forming apparatus 1 and the electronic paper 3. Alternatively, if both the image forming apparatus 1 and the electronic paper 3 are provided with an interface for wired-communication such as a USB or an Institute of Electrical and Electronics Engineers (IEEE) 1394, the image forming apparatus 1 and the electronic paper 3 may use such an interface to perform communication therebetween.

Figure 32:
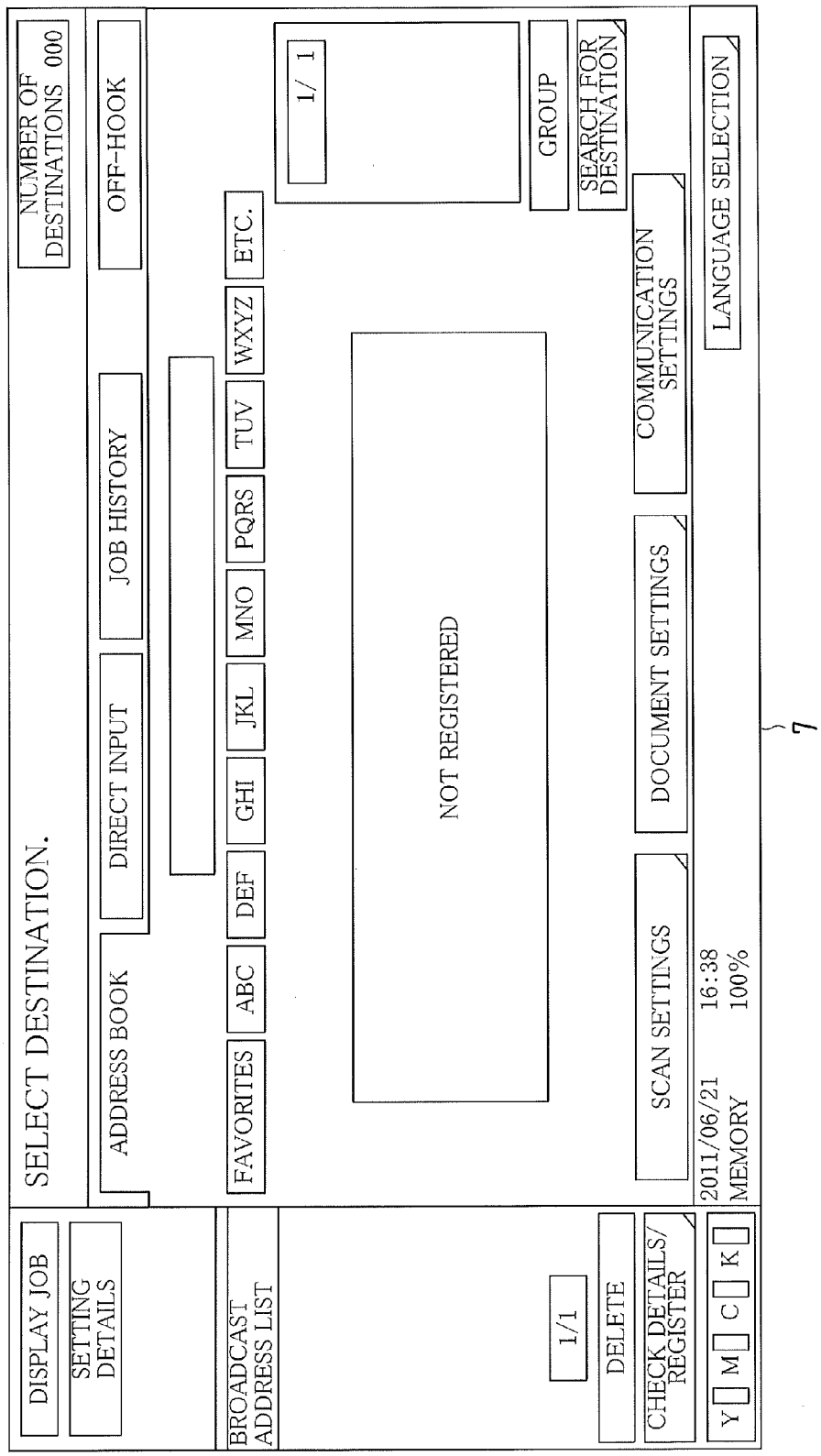
FIG. 32 is a diagram showing an example of the display form of a configuration screen for fax transmission job configurations.
Figure 33:
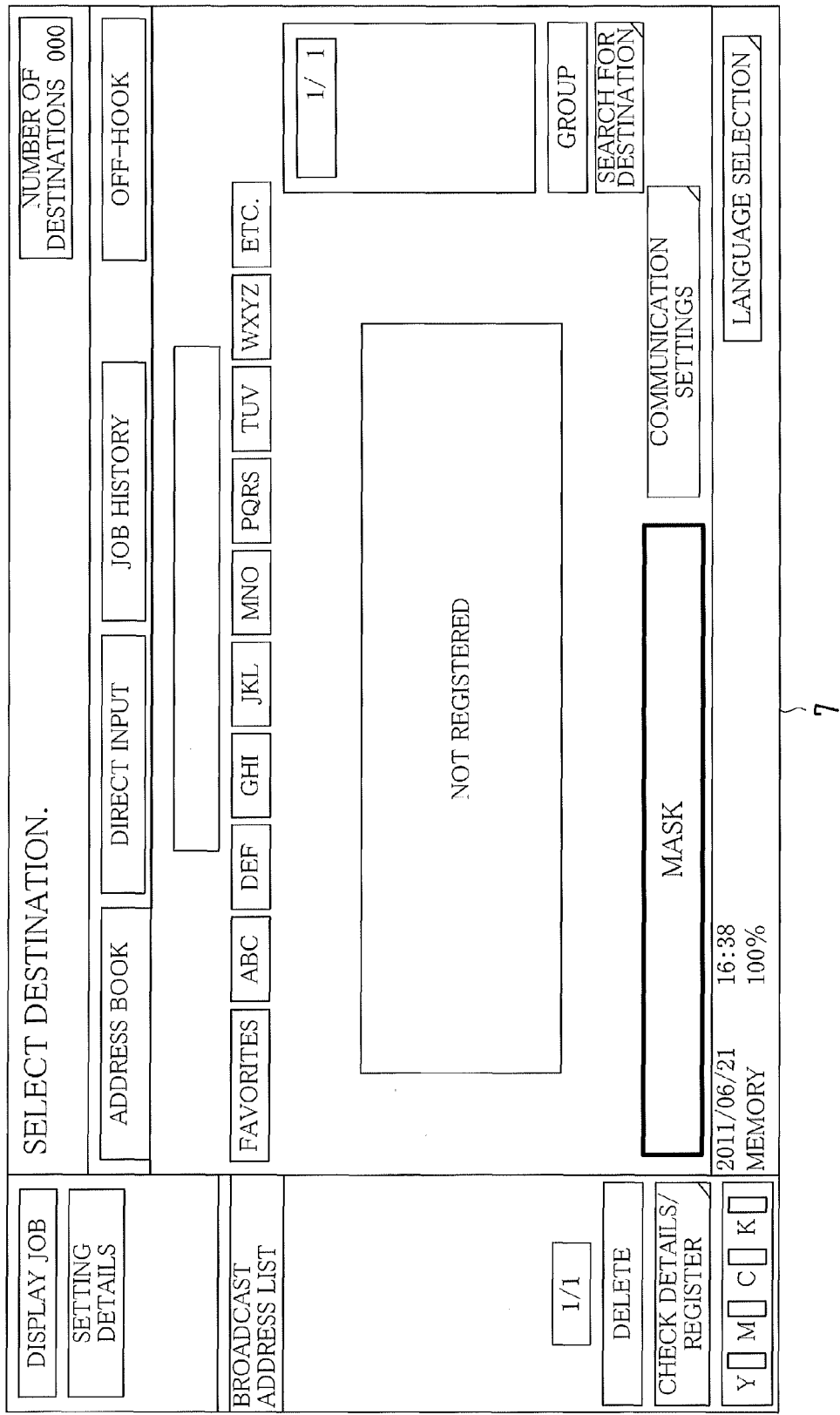
FIG. 33 is a diagram showing an example of the display form of a configuration screen for fax transmission job configurations.

FIGS. 32 and 33 are diagrams showing examples of the display form of the configuration screen 7 for fax transmission job configurations.

The embodiment is described by taking the example of a copy job; however, the present invention is also applicable to other jobs. Suppose, for example, that the image forming apparatus 1 executes a fax transmission job. In such a case, if electronic paper 3 is used as an input source medium (document input end), the image forming apparatus 1 preferably edits and displays the configuration screen 7 in the following manner.

If the type of an input source medium is an ordinary sheet, then the image forming apparatus 1 displays, as shown in FIG. 32, the configuration screen 7 without hiding objects as per the conventional art. In contrast, if the type of the input source medium is electronic paper, then the image forming apparatus 1 displays, as shown in FIG. 33, the configuration screen 7 with objects for designating document-related conditions hidden.

In the embodiment discussed above, the overall configurations of the network system NS, the image forming apparatus 1, and the electronic paper 3, the configurations of various portions thereof, the content to be processed, the processing order, the structure of the configuration screen 7, and the like may be altered as required in accordance with the subject matter of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An apparatus for outputting an image, the apparatus comprising:
    a printer;
    a storage configured to store, therein, screen data on a screen in which a plurality of visible objects are provided and on which settings regarding a process for printing an image onto an ordinary sheet with the printer are made;
    an obtaining portion configured to obtain image data for a target image that is an image to be outputted;
    an editing device for determining which of the visible objects are not related to outputting electronic paper;
    a display device configured to display, if a medium to which the target image is outputted is electronic paper, the screen based on the screen data in such a manner that any unrelated ones of the visible objects are hidden or not placed on the screen; and
    an output portion configured to output the image data to the electronic paper based on conditions designated on the screen displayed in such a manner that the unrelated object is hidden or not placed.

2. The apparatus according to claim 1, wherein the display device displays the screen in a manner to hide or not to place the unrelated object such as an object for selecting a size of paper, an object for selecting a print side of paper, an object for selecting a type of paper, or an object for selecting a finish to be applied to a printed matter.

3. The apparatus according to claim 1, comprising a detector configured to detect that a substance having a predetermined size range is placed in a position at which the paper is set to be conveyed to the printer or in a position at which the paper is ejected from the printer or a finisher, and also configured to detect that the medium is the electronic paper by receiving data indicating a predetermined state; wherein if the detector detects that the medium is the electronic paper, then the display device displays the screen with the unrelated object hidden or not placed.

4. The apparatus according to claim 3, comprising a power saving portion configured to reduce, if the detector detects that the medium is the electronic paper, power supplied to the printer.

5. The apparatus according to claim 4, wherein, if it cannot be detected that the electronic paper is placed while the screen is displayed with the unrelated object hidden or not placed, then the power saving portion stops reducing the power supplied to the printer.

6. The apparatus according to claim 3, wherein, if the detector cannot detect that the electronic paper is placed while the screen is displayed with the unrelated object hidden or not placed, then the display device displays the screen without hiding the unrelated object.

7. The apparatus according to claim 1, wherein the unrelated object differs according to specifications of the electronic paper.

8. An apparatus for inputting an image, the apparatus comprising:
   an image reader;
   a storage configured to store, therein, screen data on a screen in which a plurality of visible objects are provided and on which settings regarding a process for reading an image from an ordinary sheet with the image reader are made;
   an editing device for determining which of the visible objects are not related to inputting image data from electronic paper;
   a display device configured to display, if a medium having stored therein image data on a target image that is an image to be inputted is electronic paper, the screen based on the screen data in such a manner that any unrelated ones of the visible objects are hidden or not placed on the screen; and
   an obtaining portion configured to obtain the image data from the electronic paper based on conditions designated on the screen displayed in such a manner that the unrelated object is hidden or not placed.

9. The apparatus according to claim 8, wherein the display device displays the screen in a manner to hide or not to place the unrelated object such as an object for selecting a size of the paper, an object for selecting a type of color or monochrome of an image read from the paper, an object for designating, as a surface to be read, both faces of the paper, or an object for selecting processing to be performed on the paper.

10. The apparatus according to claim 8, comprising a detector configured to detect that a substance having a predetermined size range is placed in a position at which an original is set in an automatic document feeder of the image reader or in a glass plate of the image reader, and also configured to detect that the medium is the electronic paper by receiving data indicating a predetermined state; wherein
   if the detector detects that the medium is the electronic paper, then the display device displays the screen with the unrelated object hidden or not placed.

11. The apparatus according to claim 10, comprising a power saving portion configured to reduce, if the detector detects that the medium is the electronic paper, power supplied to the image reader.

12. The apparatus according to claim 11, wherein, if it cannot be detected that the electronic paper is placed while the screen is displayed with the unrelated object hidden or not placed, then the power saving portion stops reducing the power supplied to the image reader.

13. The apparatus according to claim 10, wherein, if the detector cannot detect that the electronic paper is placed while the screen is displayed with the unrelated object hidden or not placed, then the display device displays the screen without hiding the unrelated object.

14. The apparatus according to claim 8, wherein the unrelated object differs according to specifications of the electronic paper.

15. A computer comprising:
   a storage configured to store therein screen data on a screen in which a plurality of visible objects are provided and on which settings regarding a process for reading an image from an ordinary sheet or a process for printing an image onto an ordinary sheet are made;
   an editing device for determining which of the visible objects are not related to outputting electronic paper and which of the visible objects are not related to inputting image data from electronic paper; and
   a display processing portion configured to display on a display device, if a medium in which a target image is inputted or to which the target image is outputted is electronic paper, the screen based on the screen data in such a manner that any unrelated ones of the visible objects are hidden or not placed on the screen.

16. A method for displaying a screen used in an apparatus for outputting an image, the apparatus including a printer, and a storage for storing screen data on a screen in which a plurality of visible objects are provided and on which settings regarding a process for printing an image onto an ordinary sheet with the printer are made, the method comprising:
   causing the apparatus to perform an obtaining process for obtaining image data for a target image that is an image to be outputted;
   determining which of the visible objects are not related to outputting electronic paper;
   causing the apparatus to perform a display process for displaying, if a medium to which the target image is outputted is electronic paper, the screen based on the screen data in such a manner that any unrelated ones of the visible objects are hidden or not placed on the screen; and
   causing the apparatus to perform an output process for outputting the image data to the electronic paper based on conditions designated on the screen displayed in such a manner that the unrelated object is hidden or not placed.

17. A method for displaying a screen used in an apparatus for inputting an image, the apparatus including an image reader, and a storage for storing screen data on a screen in which a plurality of visible objects are provided and on which settings regarding a process for reading an image from an ordinary sheet with the image reader are made, the method comprising:
   determining which of the visible objects are not related to inputting image data from electronic paper;
   causing the apparatus to perform a display process for displaying, if a medium having stored therein image data on a target image that is an image to be inputted is electronic paper, the screen based on the screen data in such a manner that any unrelated ones of the visible objects are hidden or not placed on the screen; and
   causing the apparatus to perform an obtaining process for obtaining the image data from the electronic paper based on conditions designated on the screen displayed in such a manner that the unrelated object is hidden or not placed.

18. A non-transitory computer-readable storage medium storing thereon a computer program used in an apparatus for outputting an image, the apparatus including a printer, and a storage for storing screen data on a screen in which a plurality of visible objects are provided and on which settings regarding a process for printing an image onto ordinary sheet with the printer are made, the computer program causing the apparatus to perform processes comprising:
- an obtaining process for obtaining image data for a target image that is an image to be outputted;
- an editing process for determining which of the visible objects are not related to outputting electronic paper;
- a display process for displaying, if a medium to which the target image is outputted is electronic paper, the screen based on the screen data in such a manner that any unrelated ones of the visible objects are hidden or not placed on the screen; and
- an output process for outputting the image data to the electronic paper based on conditions designated on the screen displayed in such a manner that the unrelated object is hidden or not placed.

19. A non-transitory computer-readable storage medium storing thereon a computer program used in an apparatus for inputting an image, the apparatus including an image reader, and a storage for storing screen data on a screen in which a plurality of visible objects are provided and on which settings regarding a process for reading an image from ordinary sheet with the image reader are made, the computer program causing the apparatus to perform processes comprising:
- an editing process for determining which of the visible objects are not related to inputting image data from electronic paper;
- a display process for displaying, if a medium having stored therein image data on a target image that is an image to be inputted is electronic paper, the screen based on the screen data in such a manner that any unrelated ones of the visible objects are hidden or not placed on the screen; and
- an obtaining process for obtaining the image data from the electronic paper based on conditions designated on the screen displayed in such a manner that the unrelated object is hidden or not placed.

* * * * *